(12) United States Patent
Baksh et al.

(10) Patent No.: US 7,276,107 B2
(45) Date of Patent: Oct. 2, 2007

(54) INDEXING ROTARY DUAL VALVE FOR PRESSURE SWING ADSORPTION SYSTEMS

(75) Inventors: Mohamed Safdar Allie Baksh, Wheatfield, NY (US); Michael S. Manning, Buffalo, NY (US); Andrew C. Rosinski, Boston, NY (US); James Smolarek, Boston, NY (US); Alan Barnard Stewart, Snyder, NY (US); Bernard Thomas Neu, Lancaster, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/742,948

(22) Filed: Dec. 23, 2003

(65) Prior Publication Data

US 2005/0132881 A1    Jun. 23, 2005

(51) Int. Cl.
*B01D 53/02* (2006.01)
(52) U.S. Cl. .............................. 95/96; 96/121; 96/124
(58) Field of Classification Search ............ 95/96–105, 95/117–119, 130, 139, 140, 143; 96/121–124, 96/130, 143, 144; 137/240, 625.17, 625.46
See application file for complete search history.

(56) References Cited

U.S. PATENT DOCUMENTS

| | | | | |
|---|---|---|---|---|
| 1,602,500 A * | 10/1926 | Nuss | ............................. | 96/125 |
| 2,204,431 A * | 6/1940 | Moore et al. | .................. | 96/124 |
| 2,237,684 A * | 4/1941 | Moore | ............................ | 95/90 |
| 4,038,054 A * | 7/1977 | Graff | ............................ | 96/124 |
| 4,705,627 A * | 11/1987 | Miwa et al. | ................. | 210/264 |
| 4,787,417 A * | 11/1988 | Windsor, Jr. | ............ | 137/624.13 |
| 4,971,611 A * | 11/1990 | Noguchi | ....................... | 96/123 |
| 5,114,441 A * | 5/1992 | Kanner et al. | ................. | 95/98 |
| 5,256,174 A | 10/1993 | Kai et al. | ...................... | 96/116 |
| 5,584,322 A * | 12/1996 | Poschl et al. | ........... | 137/625.46 |
| 5,681,376 A * | 10/1997 | Wooten et al. | ................ | 96/124 |
| 5,779,771 A * | 7/1998 | Wooten et al. | ................ | 96/124 |
| 5,820,656 A | 10/1998 | Lemcoff et al. | ............... | 95/96 |
| 5,827,358 A * | 10/1998 | Kulish et al. | ................. | 96/115 |
| 5,891,217 A * | 4/1999 | Lemcoff et al. | ............... | 95/96 |
| 6,143,056 A | 11/2000 | Smolarek et al. | .............. | 95/96 |
| 6,311,719 B1 * | 11/2001 | Hill et al. | .................... | 137/312 |
| 6,340,382 B1 | 1/2002 | Baksh et al. | .................... | 95/96 |
| 6,372,026 B1 * | 4/2002 | Takemasa et al. | ............ | 96/112 |
| 6,457,485 B2 | 10/2002 | Hill et al. | .................... | 137/240 |
| 6,471,744 B1 * | 10/2002 | Hill | ................................ | 95/19 |
| 6,503,299 B2 | 1/2003 | Baksh et al. | .................... | 95/98 |
| 6,514,319 B2 | 2/2003 | Keefer et al. | ................. | 95/101 |
| 6,889,710 B2 * | 5/2005 | Wagner | ................. | 137/625.46 |
| 2005/0056149 A1 * | 3/2005 | Bayreuther | .................... | 95/96 |

FOREIGN PATENT DOCUMENTS

| | | | |
|---|---|---|---|
| EP | 0107179 A2 | * | 5/1984 |
| JP | 56-138576 A | * | 10/1981 |
| JP | 60-102916 A | * | 6/1985 |
| JP | 60-132622 A | * | 7/1985 |
| WO | 2004058630 A2 | | 7/2004 |

* cited by examiner

*Primary Examiner*—Robert Hopkins
(74) *Attorney, Agent, or Firm*—Flora W. Feng

(57) ABSTRACT

The present invention relates to a PSA system using an indexing rotary dual valve regulating a stepping mode of operation that controls a variable bed inlet feed flow rate, controllable pressure between feed lines in different beds of the PSA system and varied output flow rate of product gas such as high purity hydrogen gas.

20 Claims, 25 Drawing Sheets

INDEXING ROTARY DUAL VALVE FOR PRESSURE SWING ADSORPTION SYSTEMS

FIELD OF THE INVENTION

The invention relates to pressure swing adsorption (PSA) system and specifically an indexing rotary dual valve for use in PSA systems.

BACKGROUND OF THE INVENTION

The need for high purity (>99.9%) hydrogen is growing in the chemical process industries, e.g., in steel annealing, silicon manufacturing, hydrogenation of fats and oils, glass making, hydrocracking, methanol production, the production of oxo alcohols, and isomerization processes. This growing demand requires the development of highly efficient separation processes for $H_2$ production from various feed mixtures. In order to obtain highly efficient PSA separation processes, both the capital and operating costs of the PSA system must be reduced.

One way of reducing PSA system cost is to decrease the absorbent inventory and number of beds in the PSA process. In addition, further improvements may be possible using advanced cycles and adsorbents in the PSA process. However, $H_2$ feed gas contains several contaminants, e.g. a feed stream may contain $CO_2$ (20% to 25%) and minor amounts of $H_2O$ (<0.5%), $CH_4$ (<3%), $CO$ (<1%) and $N_2$ (<1%). Such a combination of adsorbates at such widely varying compositions presents a significant challenge to efficient adsorbent selection, adsorbent configuration in the adsorber, and the choices of individual adsorbent layers and multiple adsorbent bed systems to obtain an efficient $H_2$-PSA process.

Furthermore, by using fewer valves and faster PSA cycles, i.e., shorter cycle times, lead to significant reduction in adsorbent inventory and PSA system cost. Rotary valves are ideally suited for fast PSA cycles and compact PSA systems. In the application of rotary valves in the PSA systems, the rotary valve devices must accommodate the communication between feed inlet ends and product outlet ends of a PSA system as well as for allowing the flow between beds during pressure equalization step(s) of the process. Pressure equalization normally occurs by transferring a gas from one bed that has just completed its adsorption step to an evacuated bed that has just completed its adsorbent regeneration step.

Relevant background art for PSA systems can be found in the following patents, all of which are hereby incorporated by reference.

U.S. Pat. No. 6,514,319 discloses a gas separation by pressure swing adsorption (PSA) and vacuum pressure swing adsorption (VPSA), to obtain a purified product gas of the less strongly adsorbed fraction of the feed gas mixture, is performed with an apparatus having a plurality of adsorbers. The adsorbers cooperate with the first and second valves in a rotary PSA module, with the PSA cycle characterized by multiple intermediate pressure levels between the higher and lower pressures of the PSA cycle. Gas flows enter or exit the PSA module at the immediate pressure levels as well as the higher and lower pressure levels, under substantially steady conditions of flow and pressure. The PSA module comprises a rotor containing laminated sheet adsorbers and rotating within a stator, with ported valve faces between the rotor and stator to control the timing of the flows entering or exiting the adsorbers in the rotor.

U.S. Pat. No. 6,457,485 discloses a rotary valve assembly for a pressure swing adsorption system. The rotary valve assembly includes a first valve member and a second valve member relatively rotatable about a common center of rotation to provide valving action for selectively transferring fluids therethrough. The second valve member has a first fluid section with at least one aperture adapted for transferring a first fluid of a first pressure and composition therethrough and a second fluid section with at least one aperture adapted for transferring a second fluid of a second pressure and composition therethrough. The first valve member has a first fluid section with at least one passage for transferring the first fluid in the valve assembly and a second fluid section with at least one passage for transferring the second fluid in the valve assembly. A vent is located between the first fluid sections and the second fluid sections of the valve assembly and is vented to a pressure lower than the pressures of the first and second fluids so as to vent leakage from either of the sections of the valve assembly. The rotary valve assembly further includes means for effecting relative rotation of the first valve member and second valve member.

U.S. Pat. No. 5,820,656 discloses a rotary valve system which includes a pair of valve assemblies each of which has valve parts with flat faces which, when pressed together and rotated, provide valving action between various ports incorporated in one valve part of each assembly. The first valve part of each assembly contains a circular array of through openings, each of which is connected to a conduit. The second valve part of each assembly contains several passages which provide communication between various openings of the first valve part and valve apertures located in the second valve part of each assembly. The second valve part of one assembly also contains one or more passages which provide communication between members of one or the other array of openings. The valve system can be effectively used to automate operation of a gas or liquid adsorption system comprising two or more adsorption vessels, the number of vessels being equivalent to the total number of openings in either array. Use of the valve assembly in an adsorption system eliminates the need for many of the valves required in conventional multi vessel adsorption systems.

U.S. Pat. No. 6,143,056 discloses a dual-chambered, four-ported rotary valve with a rotatable drum having peripheral openings is used to selectively connect vacuum, and/or air sources and a vent to adsorption chambers in a two-bed VPSA system to replace separate valves and produce low cost enriched oxygen, via reduced power, increased reliability, and reduced complexity and cost.

U.S. Pat. No. 5,256,171 discloses a pressure-swing adsorption type gas separator system includes two adsorption vessels and a switching valve for placing each of the adsorption vessels alternately in communication with a raw gas source and an exhaust gas line so that a pressurized adsorption process and a reduced-pressure desorption process are sequentially carried out in each of the vessels. The switching valve is a four-port rotary valve having four ports connected to the adsorption vessels, a raw gas source and an exhaust gas line and is driven by a rotary drive. Preferably, the rotary drive is a drive motor for a pressurizing pump provided in a raw gas line, and the four-port rotary valve is connected to the drive motor via a speed reducer.

U.S. Pat. No. 6,503,299 discloses a two bed pressure swing adsorption process for recovering a primary gaseous component at a purity of over 99% from a feed gas comprising the primary component and one or more impurities. Once such process includes: (a) passing the feed gas through a first adsorption bed to remove one or more impurities; (b) conducting a pressure swing adsorption cycle in the first bed; (c) separately passing effluent gases from the first bed into at least two separate tanks for subsequent purging and pressurization of the beds; (d) storing a gas mixture in the first of the tanks containing the primary component in a concentration higher than the concentration of the primary component in the gas mixture in the second of the tanks; (e) refluxing the mixture of the primary component from the second tank in the first adsorption bed during the regeneration steps therein; (f) refluxing the mixture of the primary component from the first tank in the first adsorption bed during the regeneration steps therein; (g) simultaneously and non-concurrently performing steps (a) to (f) in a second bed; and (h) recovering the product gas stream.

U.S. Pat. No. 6,349,382 discloses a pressure swing adsorption process for purifying a syntheses gas stream containing from 60 to 90 mole % hydrogen and impurities such as $CO_2$, $CH_4$, $N_2$, and CO. The PSA process of the invention further provides a method of adsorbing substantially all of the nitrogen and other contaminants from the feed gas stream; wherein the feed stream is passed at superatmospheric pressure through a plurality of adsorbent beds and each adsorbent bed contains at least a CaX, LiA, LiX or calcium containing mixed cation zeolite having a $SiO_2/Al_2/O_3$ mole ratio of 2.0–2.5. Such process involves sequentially pressurizing, purging and repressurizing the adsorbent beds with product hydrogen, and recovering product hydrogen in purities of 99.9% or greater from the beds.

It is an object of the present invention to provide an indexing rotary dual valve for PSA systems that permits the system to operate with adsorption cycles including pressure equalization step including product gas flow step, vessel purging step and/or product gas to be backfilled.

Another object in the present invention is to provide a low cost $H_2$PSA process using indexing rotary valves for the production of hydrogen from feed gas containing impurities such as $CO_2$, $H_2O$, $CH_4$, CO, $N_2$ and inert gases such as Argon.

Another object of the present invention to provide a $H_2$PSA process which eliminates excess piping connecting the system components.

Another object of the invention is to provide a $H_2$PSA process with improved PSA cycles and efficiencies via the use of indexing rotary valves and control of the individual step times in the PSA cycle.

Another object of the invention is to provide new PSA cycles; wherein, variable bed inlet flow rate is utilized to control the spreading of the mass transfer zones; thereby, achieving enhanced PSA process performance over prior art $H_2$PSA processes.

SUMMARY OF THE INVENTION

The invention relates to indexing rotary dual valve for use in a pressure swing adsorption system (PSA) having at least two beds operating in multiple steps in a PSA cycle comprising:

a first valve assembly comprising a first stationary section having apertures adapted such that each aperture accommodates a different gas feed line from a PSA bed; a first rotatable valve section having at least two spaced-apart openings separated at a preselected arcuate degree setting and at least one channel disposed on the first valve section connected to at least one of the openings adapted for providing regulation of the pressurization of a gas between PSA beds and a second stationary section and all sections form the first valve assembly having a gas output opening adapted for exiting a gas product;

a second valve assembly comprising a third stationary section, a second rotatable valve section having at least two spaced-apart openings separated at a preselected arcuate degree setting, and a fourth stationary section having aperture adapted such that each aperture accommodates a different gas feed line from a PSA bed, and all sections from the second valve assembly having a gas input opening adapted for receiving a feed gas and providing a constant equal or unequal feed flow rate between the PSA beds;

an indexing drive mechanism adapted for providing a preselected index setting and capable of controlling the intervals of each step in a PSA cycle;

and a rotatable shaft having the top portion secured to the first valve assembly, the bottom portion secured to the second valve assembly, and the indexing drive mechanism secured to the shaft and disposed between the two valve assemblies.

This invention relates to a pressure swing adsorption process (PSA) having at least two beds operating in multiple steps in a PSA cycle for recovering high purity gas product from a feed gas containing impurities using an indexing rotary valve comprising:

a) providing a source of feed gas; a source of suction force, multiple bed system, and an indexing rotary valve;

b) feeding said feed gas through the indexing rotary valve to a bed for selectively removing an undesired component from said feed gas using selected adsorbers under selected pressures and using the indexing rotary valve for providing a constant equal or unequal feed flow rate between the PSA beds for controlling the depressurization by varying equalization down in one bed and equalization up in another bed to increase a high purity gas product output and purge gas; and c) using the indexing rotary valve for receiving and repelling the feed gas controlling the interval of each step in the PSA cycle, for receiving and repelling the purge gas, and for receiving and thus collecting and dispensing the high purity gas product.

This invention discloses a compact PSA process using two indexing rotary valves for the production of high purity gas such as hydrogen, helium, methane or natural gas with high recoveries. Key features include variable inlet feed flow rate to each bed (i.e., one bed receives all of the feed during certain times in the adsorption step, and at the beginning and towards the end of the adsorption step, two beds are receiving the feed). In addition, novel flow channels or flow paths are used in the upper and lower rotary valves to run the steps in the PSA cycles. The upper and lower rotary valves are driven by stepping device(s) that do not rotate continuously with a fixed rpm. Thus, the duration of, each step in the PSA cycle can be controlled to achieve enhanced PSA process performance over prior art PSA processes. As a result, the novel indexing rotary dual valve control provides at least 20% reduction in capital cost and greater than 8% improvement in recovery of hydrogen achieved using the PSA system of this invention.

BRIEF DESCRIPTION OF THE DRAWINGS

The features of the invention believed to be novel and the elements characteristic of the invention are set forth with particularly in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 3A illustrates steps 1-6 and FIG. 3B illustrates steps 7-12.

Figure 1:
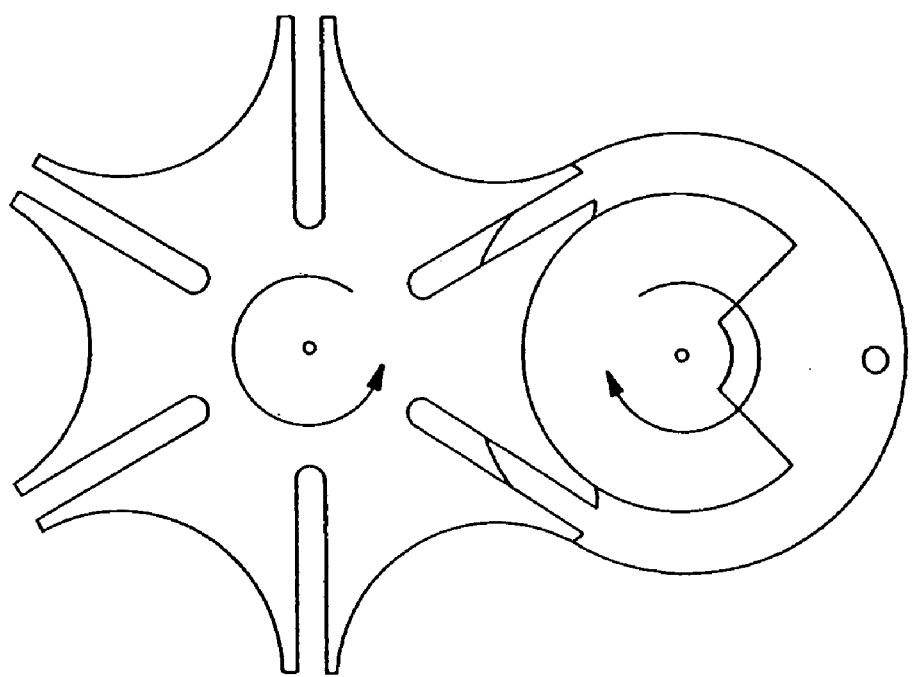
FIG. 1 is a schematic of a Geneva Mechanism used in prior art rotary valve PSA processes.
Figure 2:
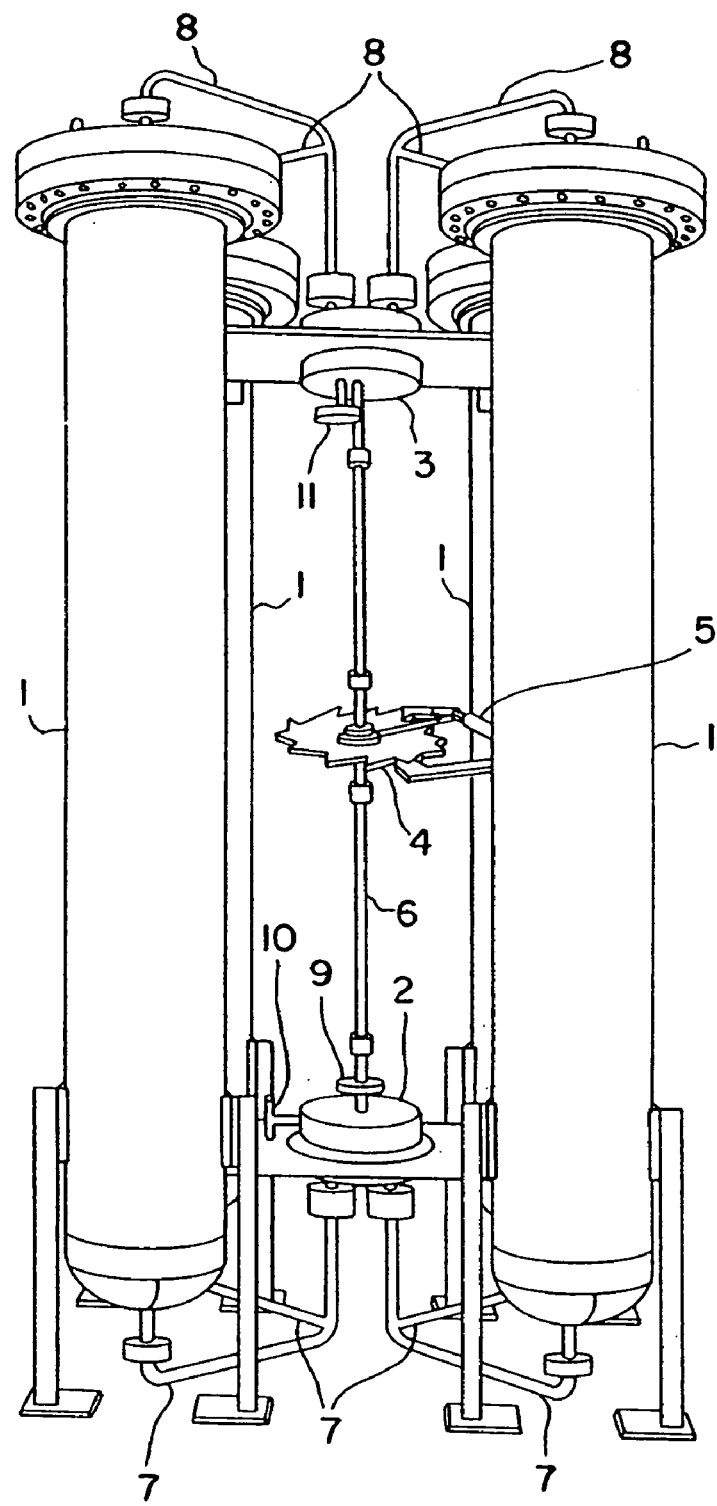
FIG. 2 is a four bed PSA process using a rotary indexing valve train driven by a common source in accordance with the invention.

Another aspect of the present invention is a PSA apparatus for recovering high purity gas such as hydrogen gas having the following key features:

a) PSA apparatus shown in FIG. 2 (feed and product rotary valves driven by a common indexing mechanism) comprising rotary product and feed valves (FIG. 4) with novel ports and flow paths—product valve (upper stationary disk, rotating disk, lower stationary disk), and feed valve (upper stationary disk, rotating disk, lower stationary disk)

Figure 5:
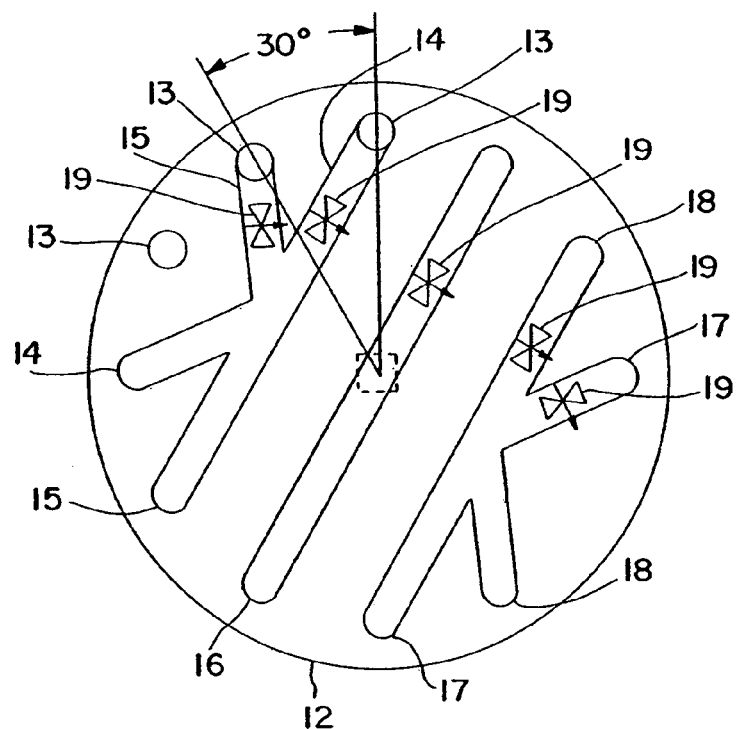
FIG. 5 is a schematic of the flow paths in the 30° indexing disk portion of the rotary product multiport valve for a four bed, 12-step PSA cycle using constant feed flow rate in each bed.
Figure 6:
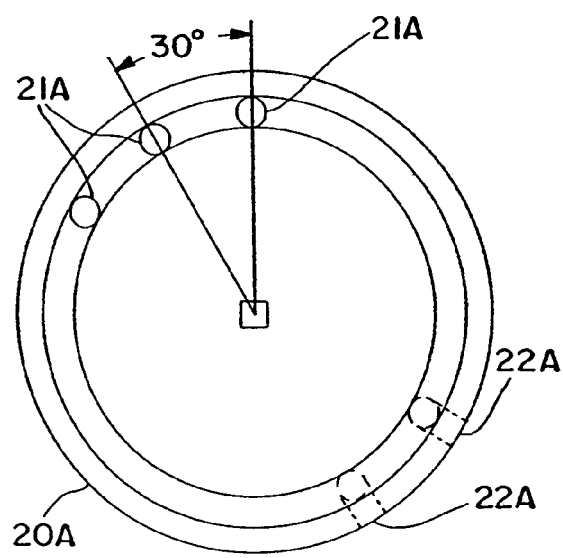
FIG. 6 is a schematic of the flow paths in the 30° indexing disk portion of the rotary feed multiport valve for a four bed, 12-step PSA cycle using constant feed flow rate in each bed.
Figure 7:
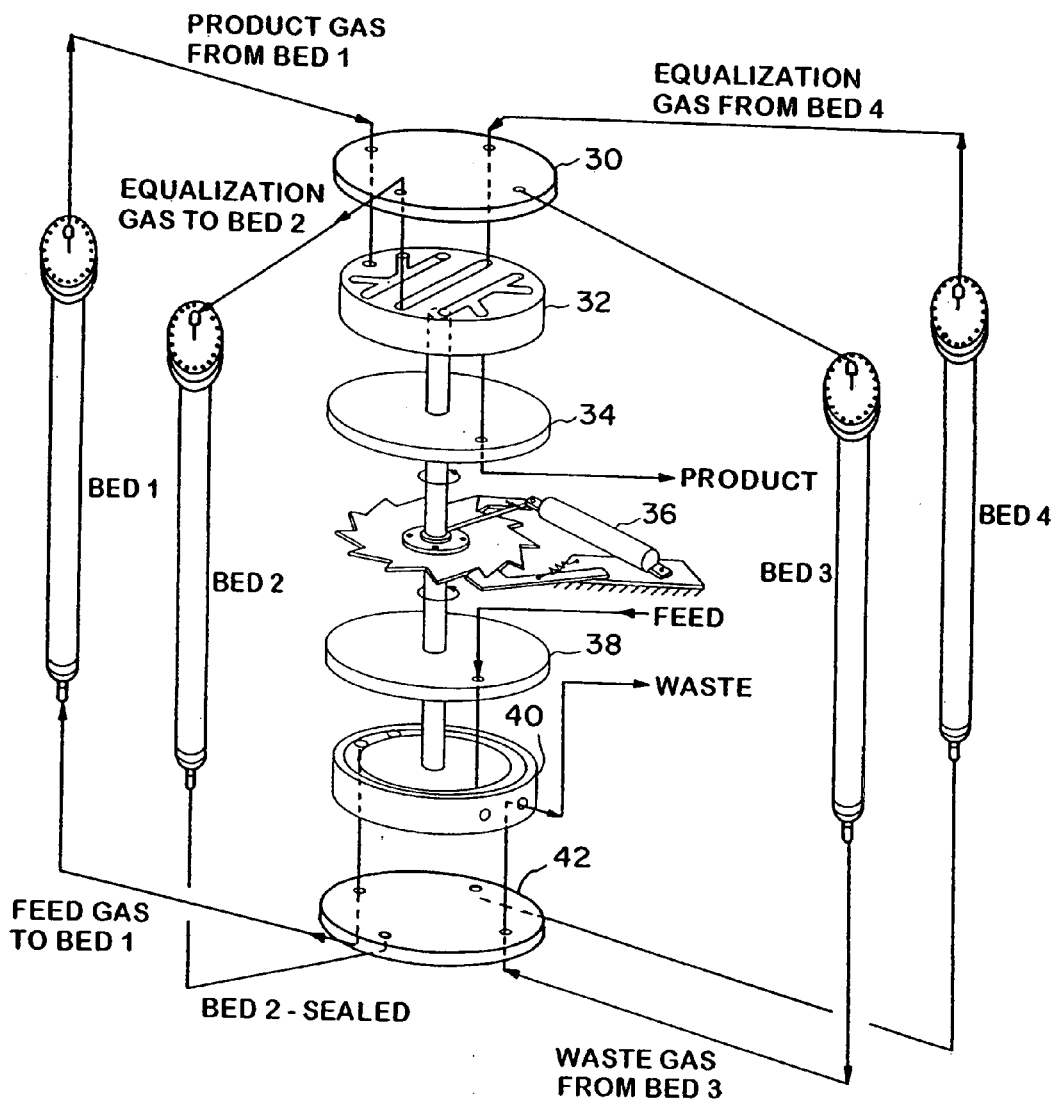
FIG. 7 is a schematic of the flow paths (and bed connections) during STEP 1 of the PSA cycle depicted in FIG. 3 and the multiports depicted in FIGS. 5 and 6.
Figure 8:
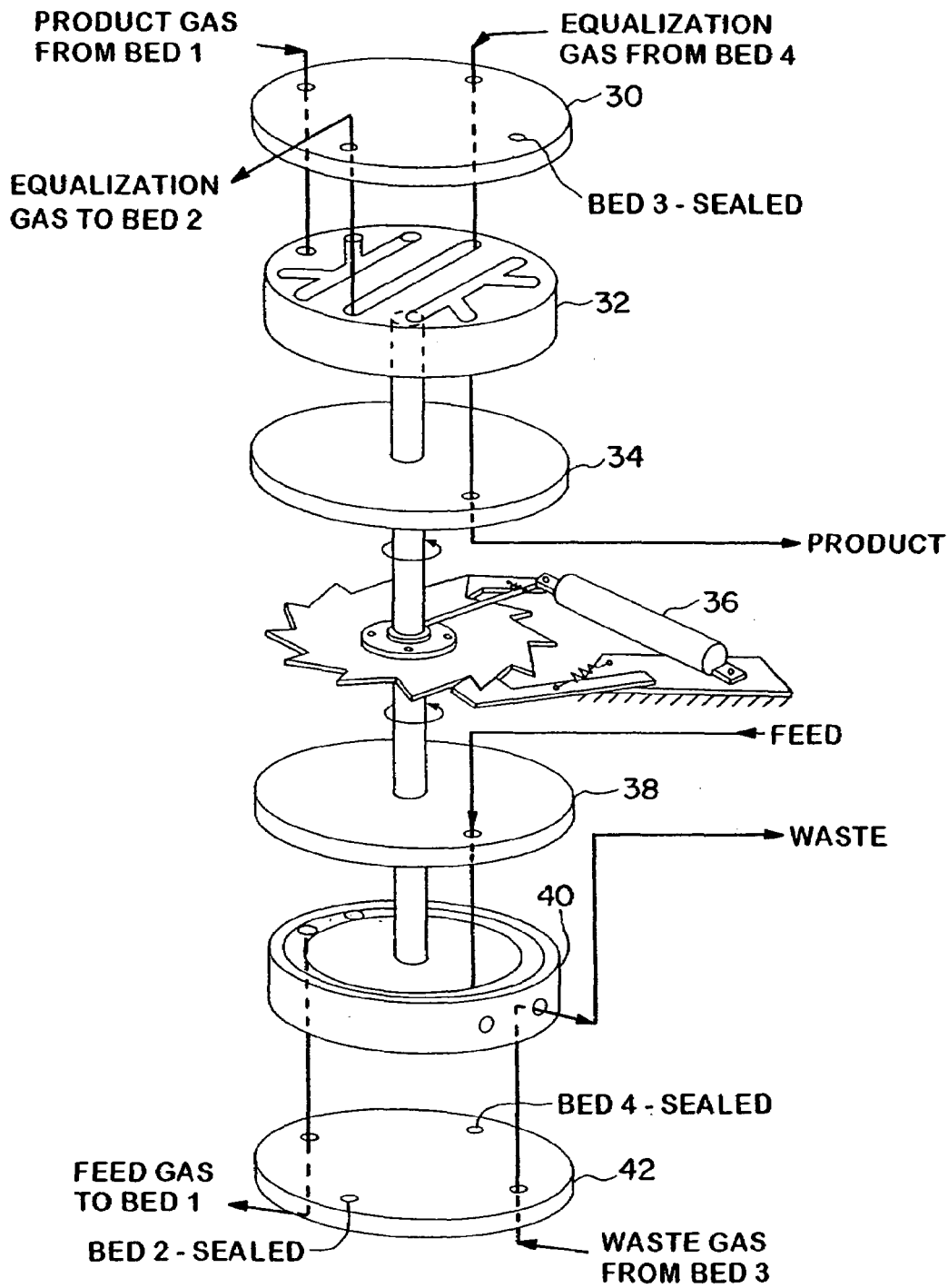
FIG. 8 is a schematic of the flow paths during STEP 1 of the PSA cycle depicted in FIGS. 3A and 3B and the multiports depicted in FIGS. 5 and 6.
Figure 9:
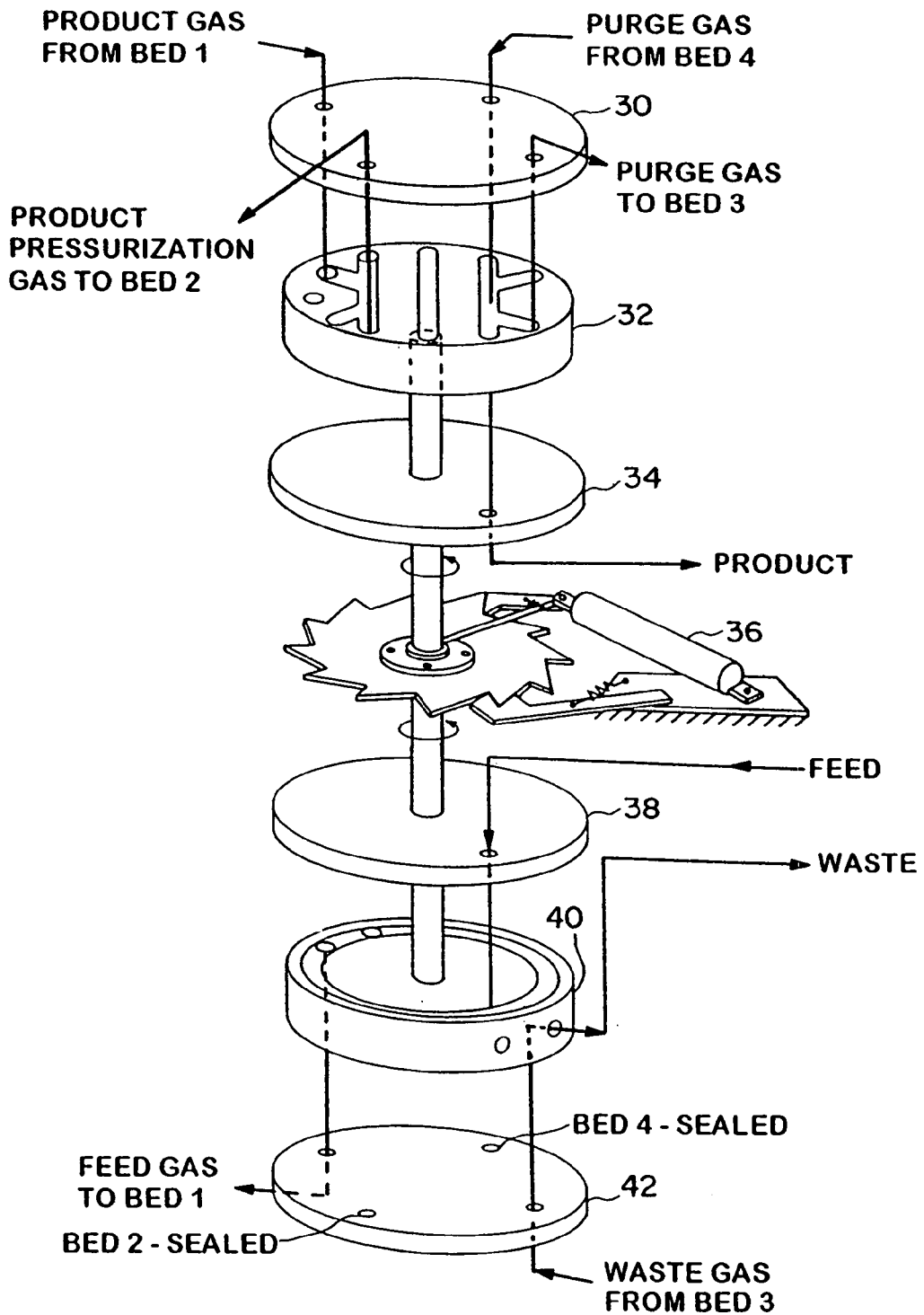
FIG. 9 is a schematic of the flow paths during step 2 of the PSA cycle depicted in FIGS. 3A and 3B and the multiports depicted in FIGS. 5 and 6.
Figure 10:
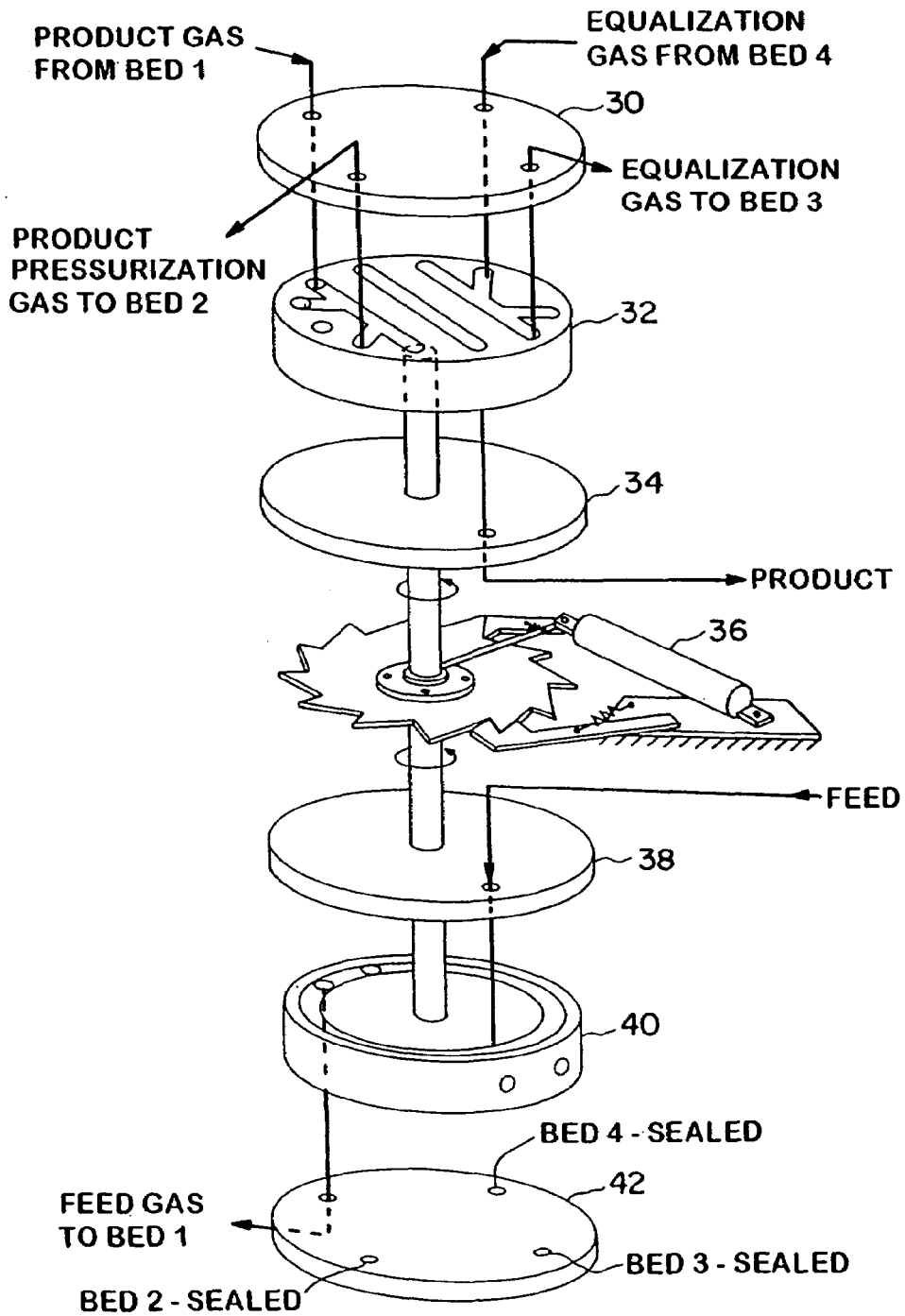
FIG. 10 is a schematic of the flow paths during STEP 3 of the PSA cycle depicted in FIGS. 3A and 3B and the multiports depicted in FIGS. 5 and 6.
Figure 11:
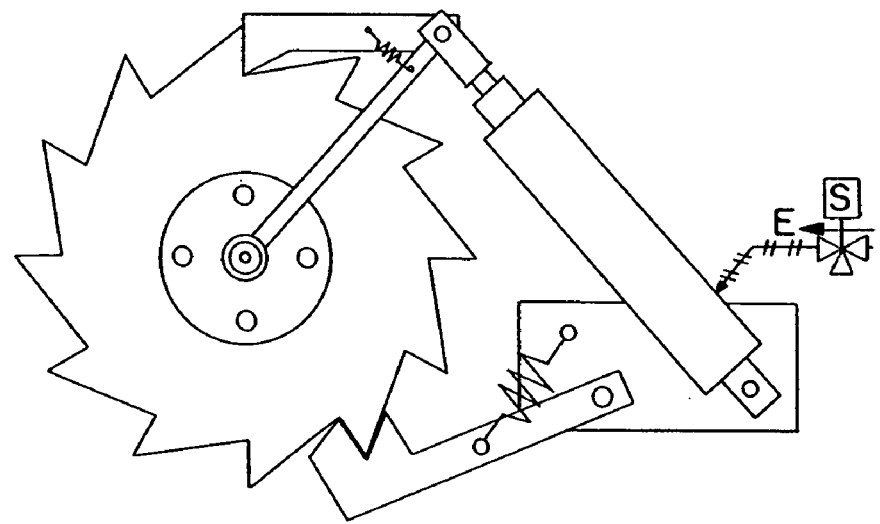
FIG. 11 is a schematic of a ratchet 30° indexing mechanism linearly actuated by an air cylinder.
Figure 12:
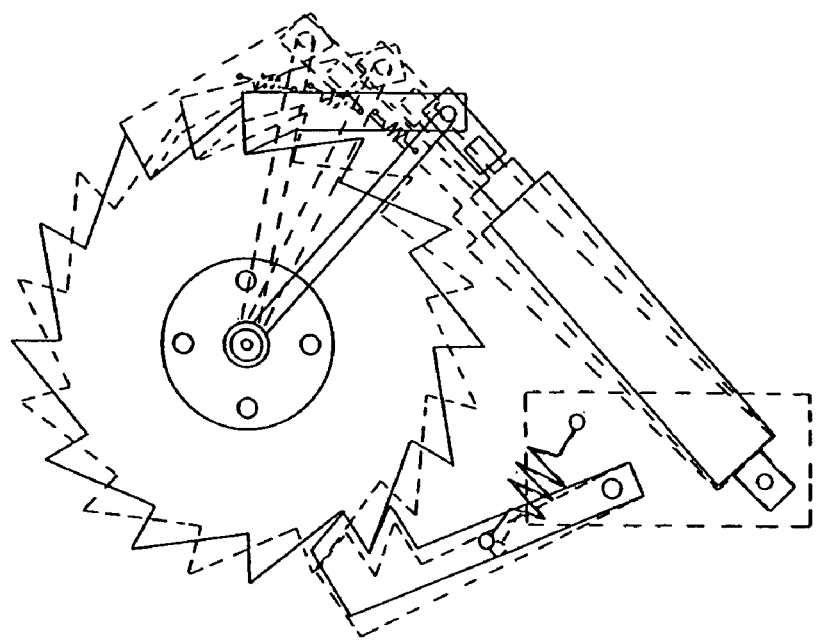
FIG. 12 is a schematic of one complete 30° motion of the ratchet indexing mechanism.

1) For 4-bed 12-step PSA Cycle of FIG. 3 (Table 1) that feeds all of the feed gas to a single adsorption vessel during an adsorption step
   feed valve—FIGS. 6 and 7
   product valve—FIGS. 5 and 7
   step 1 flow paths—FIGS. 7 and 8
   step 2 flow paths—FIG. 9
   step 3 flow paths—FIG. 10
   indexing mechanism—FIGS. 11 and 12

Figure 13A:
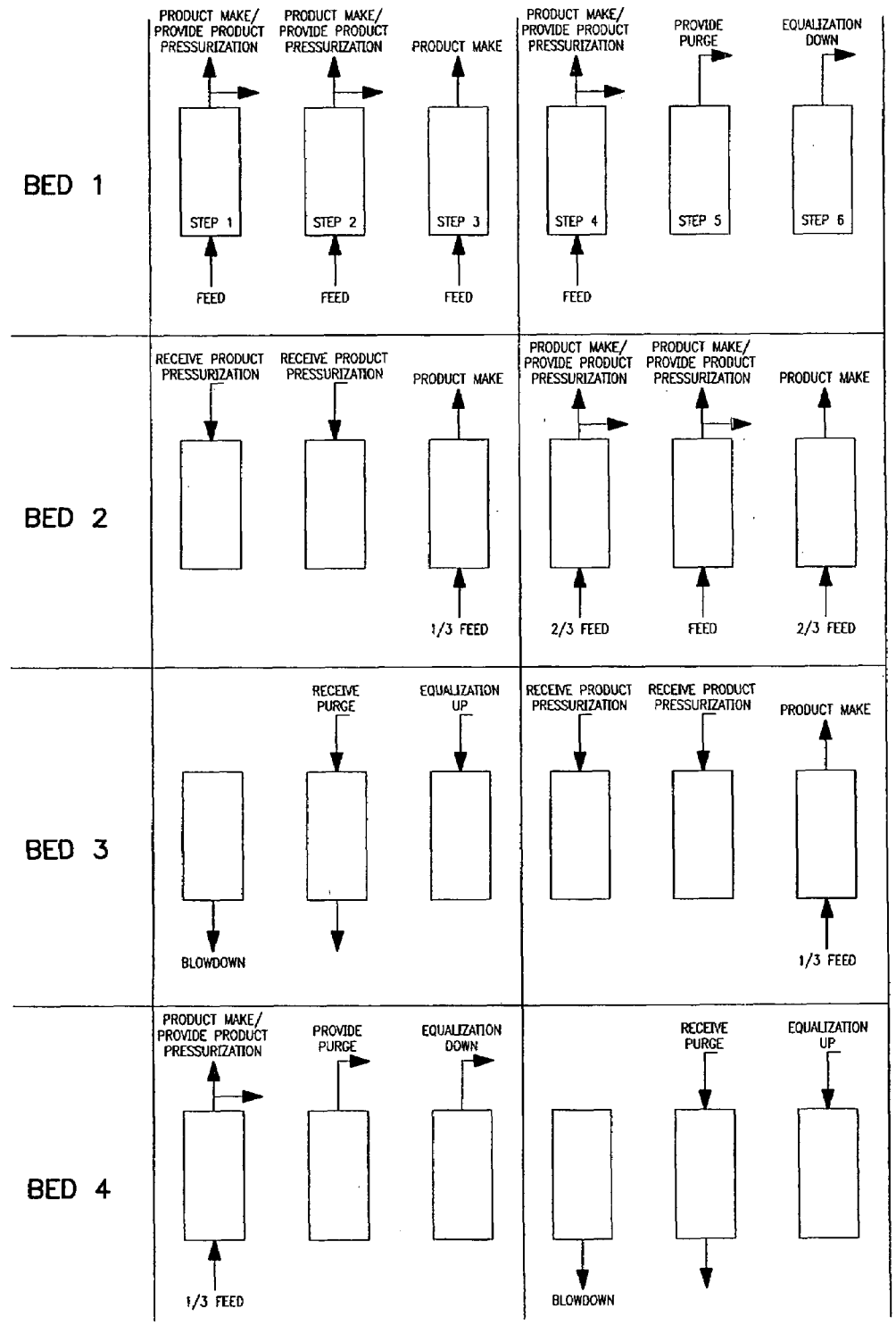
FIGS. 13A and 13B are a schematic of a four-bed PSA column cycle with variable inlet flow rate.
Figure 13B:
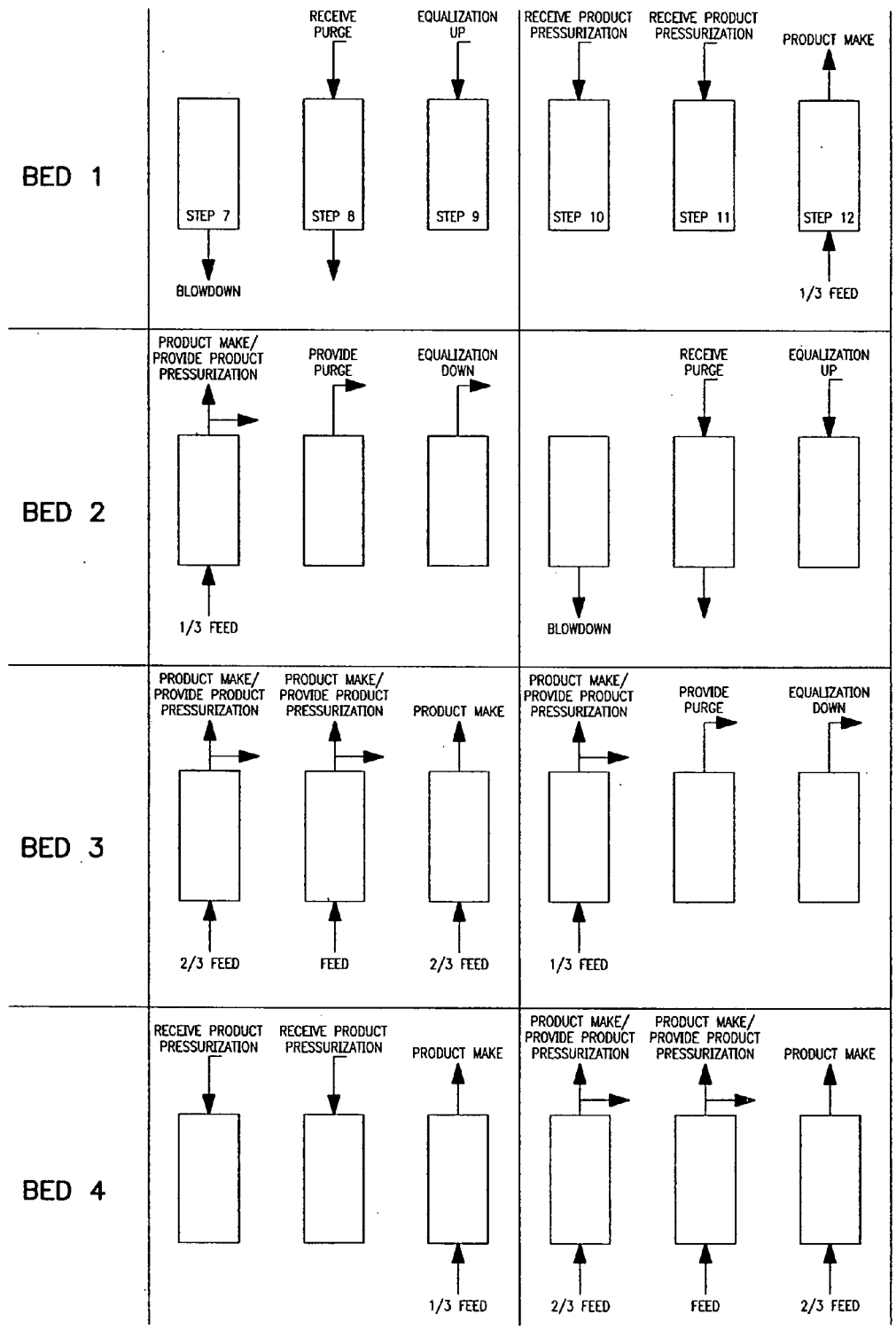
Figure 14:
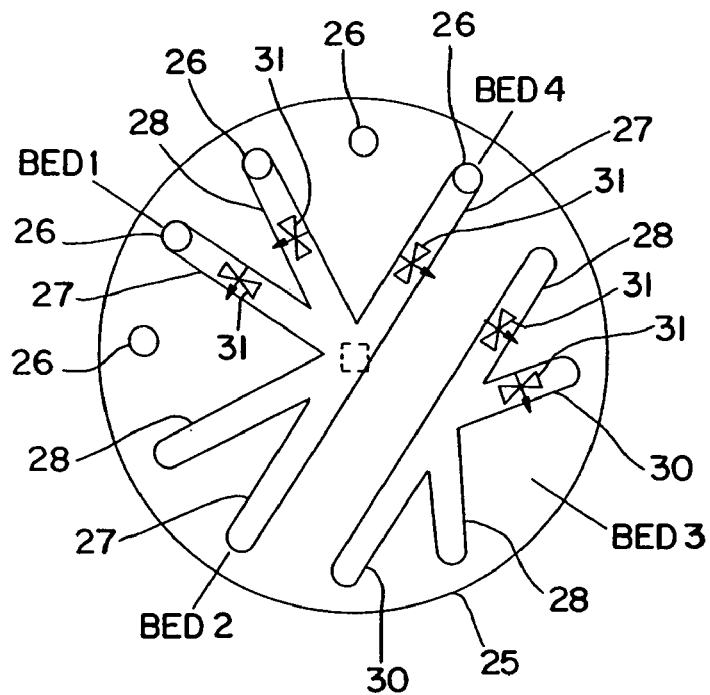
FIG. 14 is a schematic of the flow paths in the 30° indexing disk portion of the rotary product multiport valve for a four bed, 12-step PSA cycle using variable feed flow rate in each bed.
Figure 15:
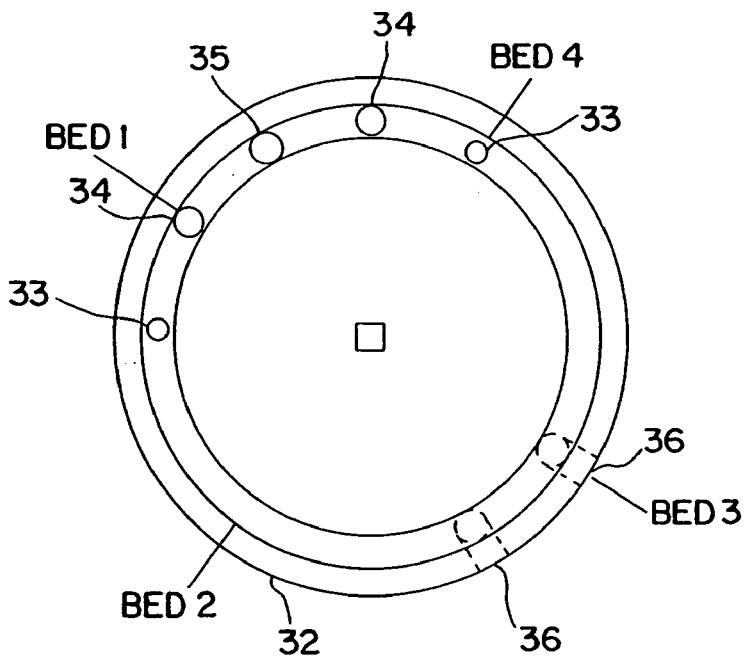
FIG. 15 is a schematic of the flow paths in the 30° indexing disk portion of the rotary feed multiport valve for a four bed, 12-step PSA cycle using variable feed flow rate in each bed.
Figure 16A:
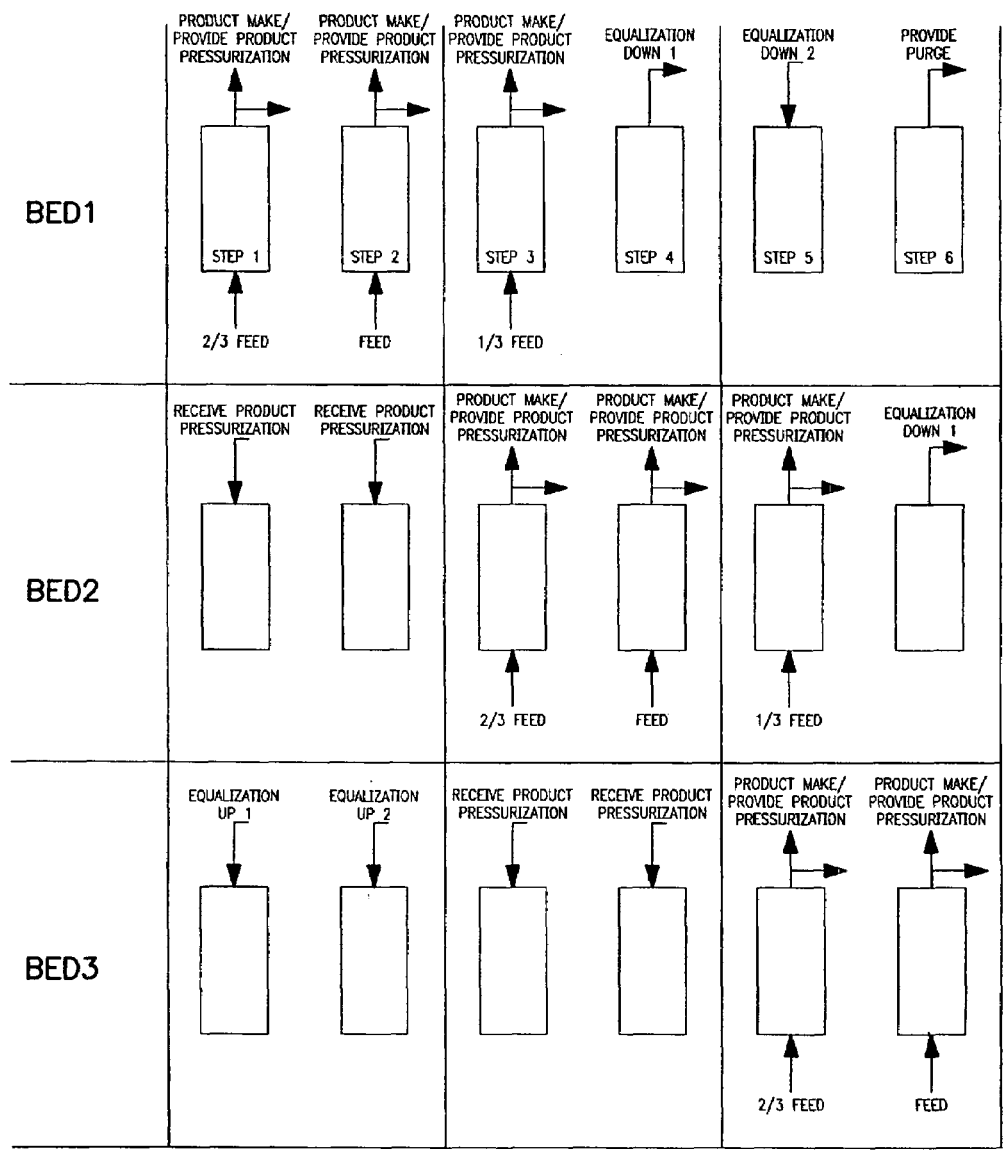
FIGS. 16A, 16B, 16C and 16D are a schematic of a six-bed PSA column cycle with variable inlet flow rate.
Figure 16B:
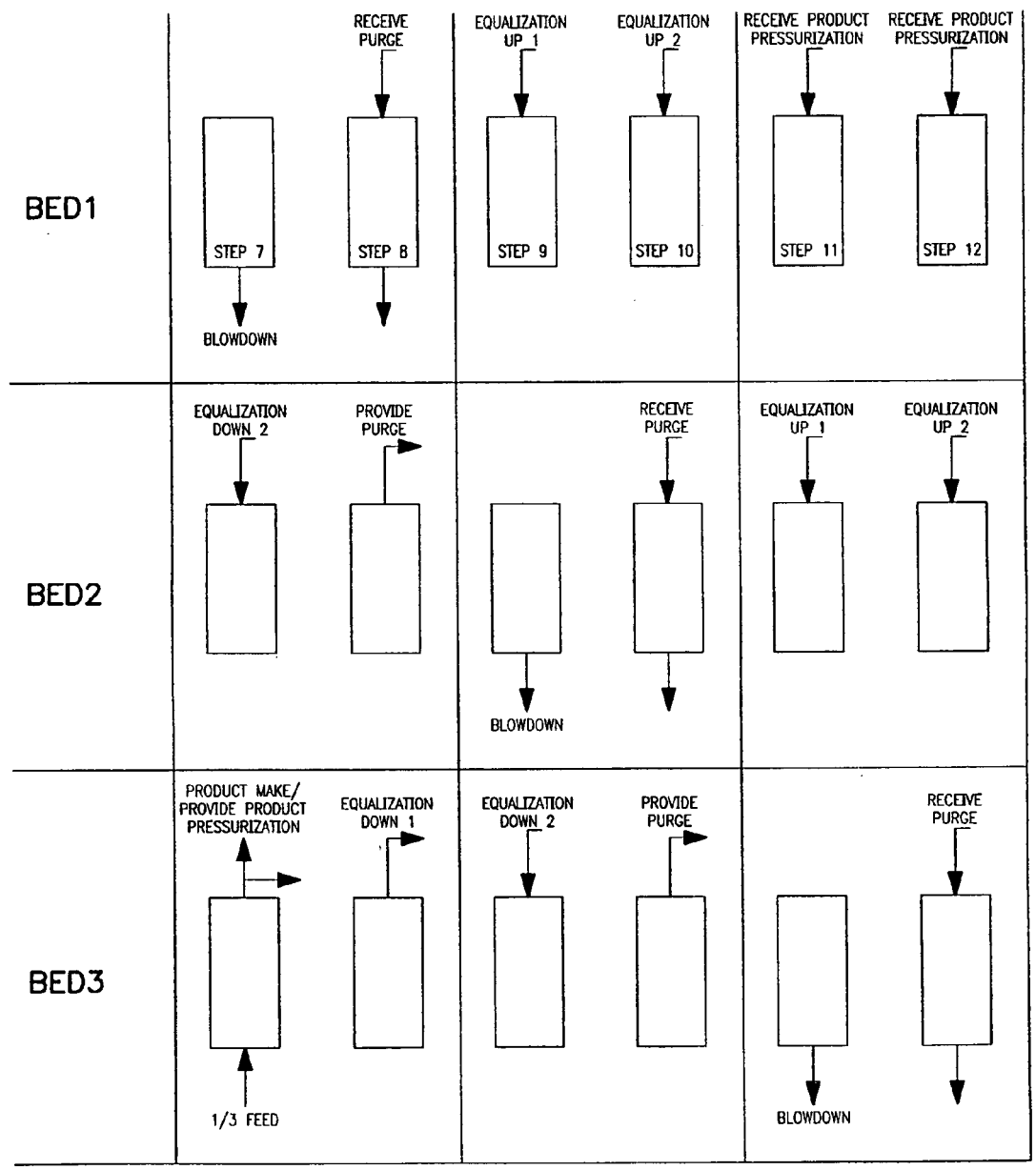
Figure 16C:
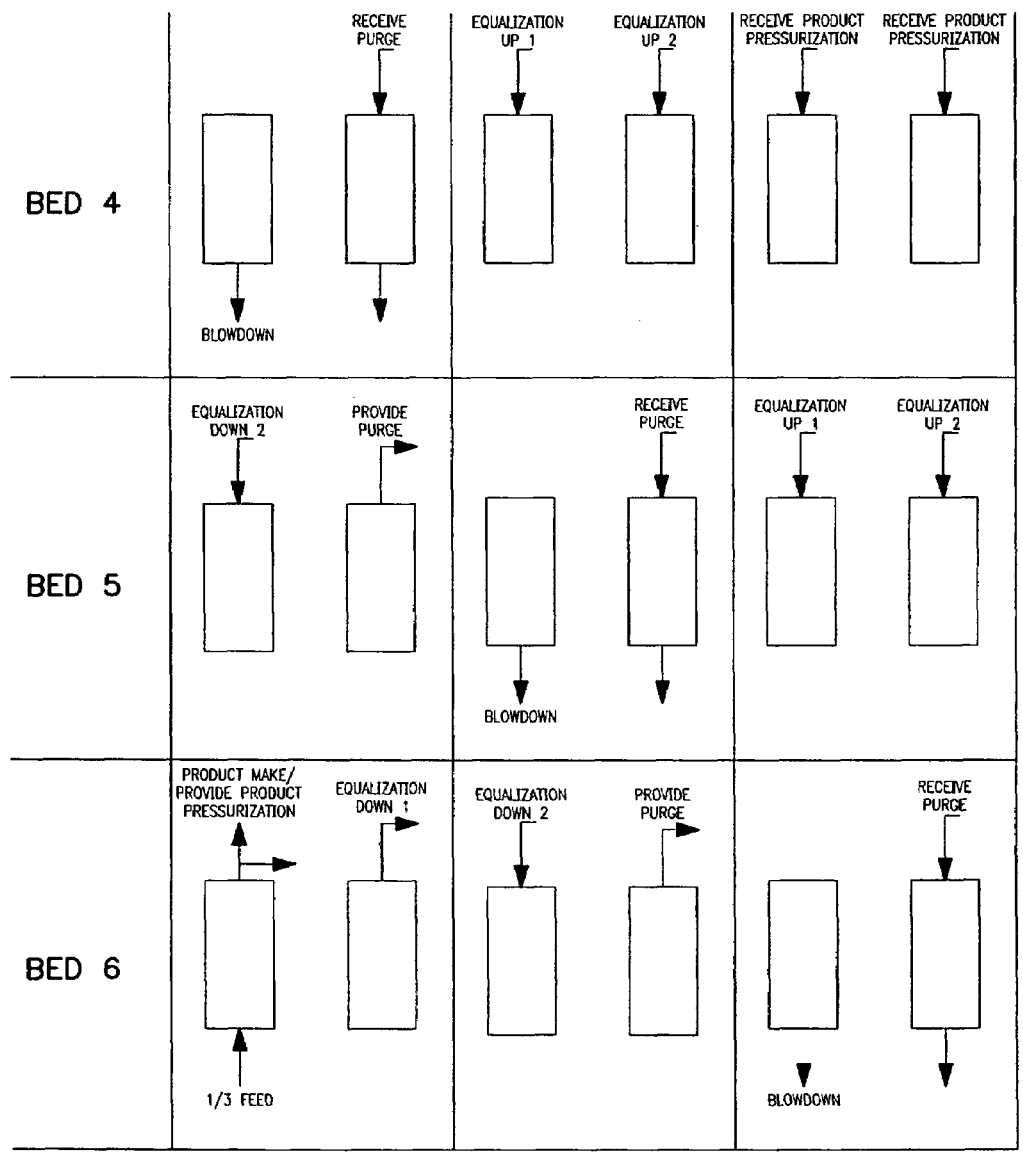
Figure 16D:
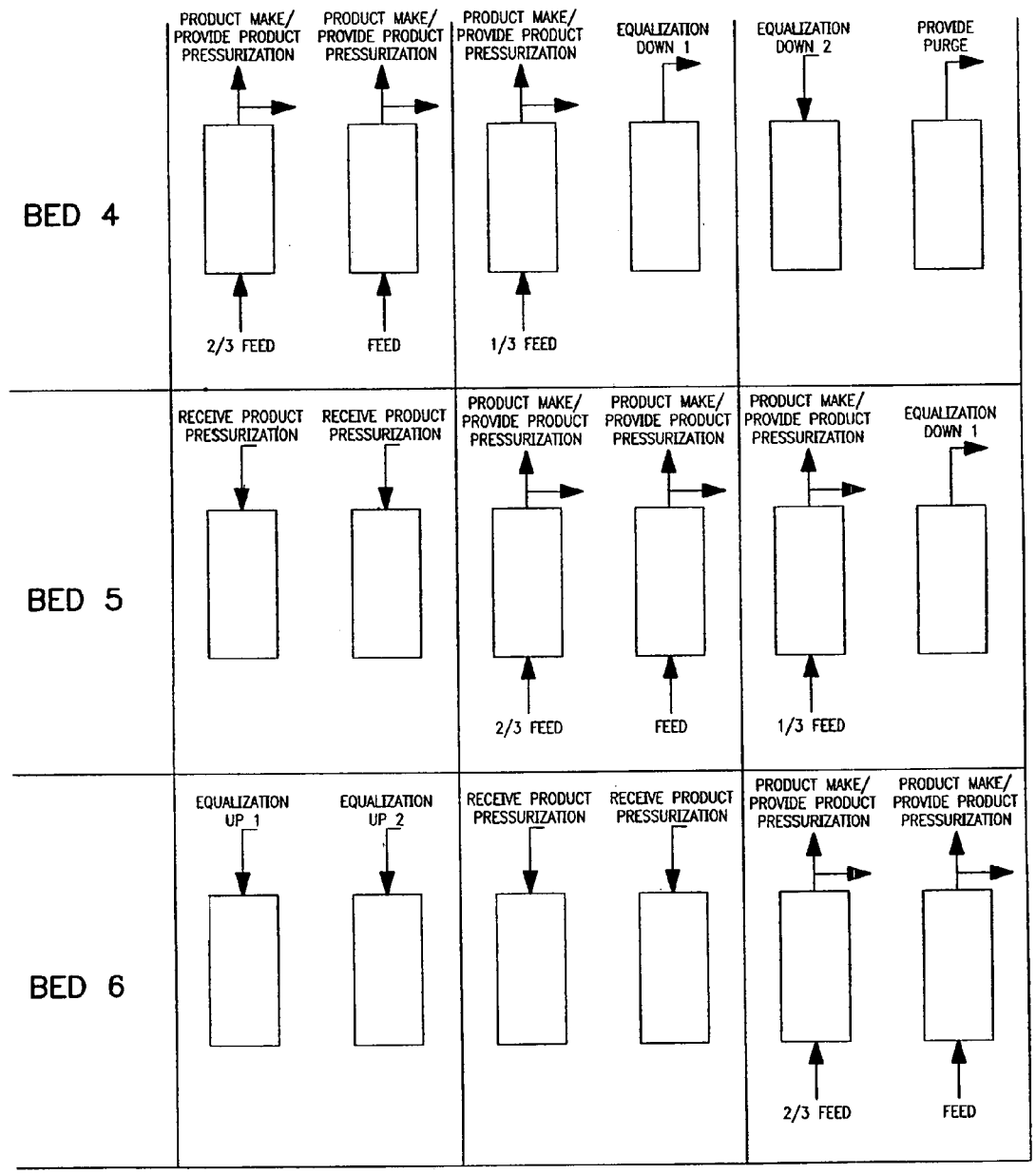

2) For 4-bed 12-step PSA Cycle of FIGS. 13A and 13B (Table 2) that splits feed gas into unequal portions and feeds it to more than one adsorption vessel during start and stop phases of the adsorption step, but during remainder of the adsorption step it feeds all of the gas to only a single adsorption vessel
   feed valve—FIG. 15, orifices are sized to flow ⅓, ⅔, 1, ⅔ and ⅓ of the total feed gas to an adsorption vessel at various times during the adsorption step
   product valve—FIG. 14
   indexing mechanism—FIGS. 11 and 12

Figure 17:
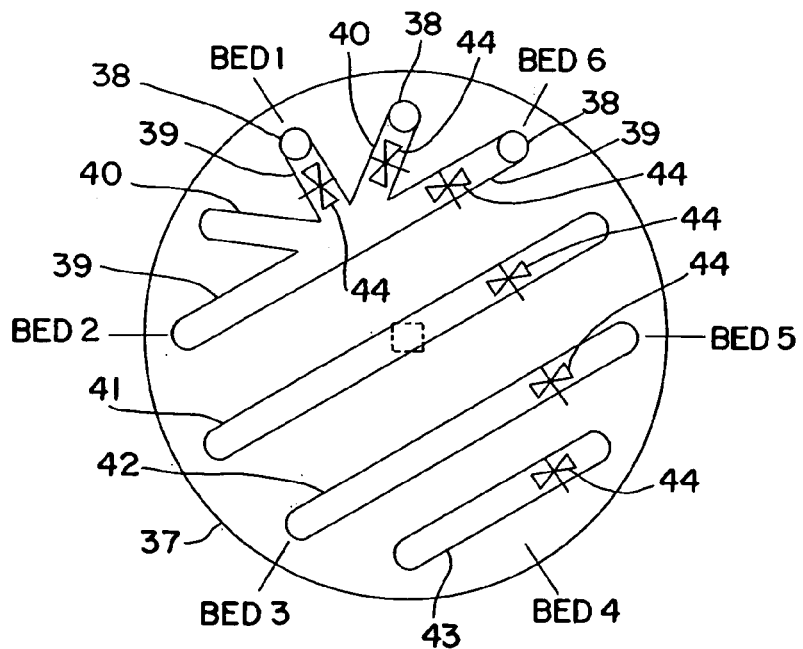
FIG. 17 is a schematic of the flow paths in the 30° indexing disk portion of the rotary product multiport valve for a six-bed, 12-step PSA cycle using variable feed flow rate in each bed.
Figure 18:
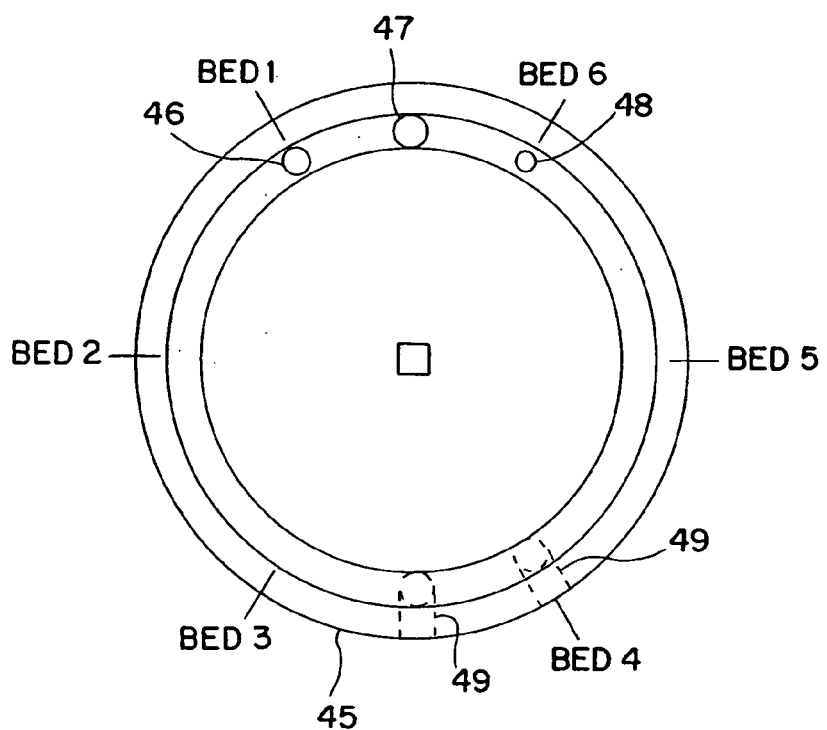
FIG. 18 is a schematic of the flow paths in the 30° indexing disk portion of the rotary feed multiport valve for a six-bed, 12-step PSA cycle using variable feed flow rate in each bed.
Figure 19:
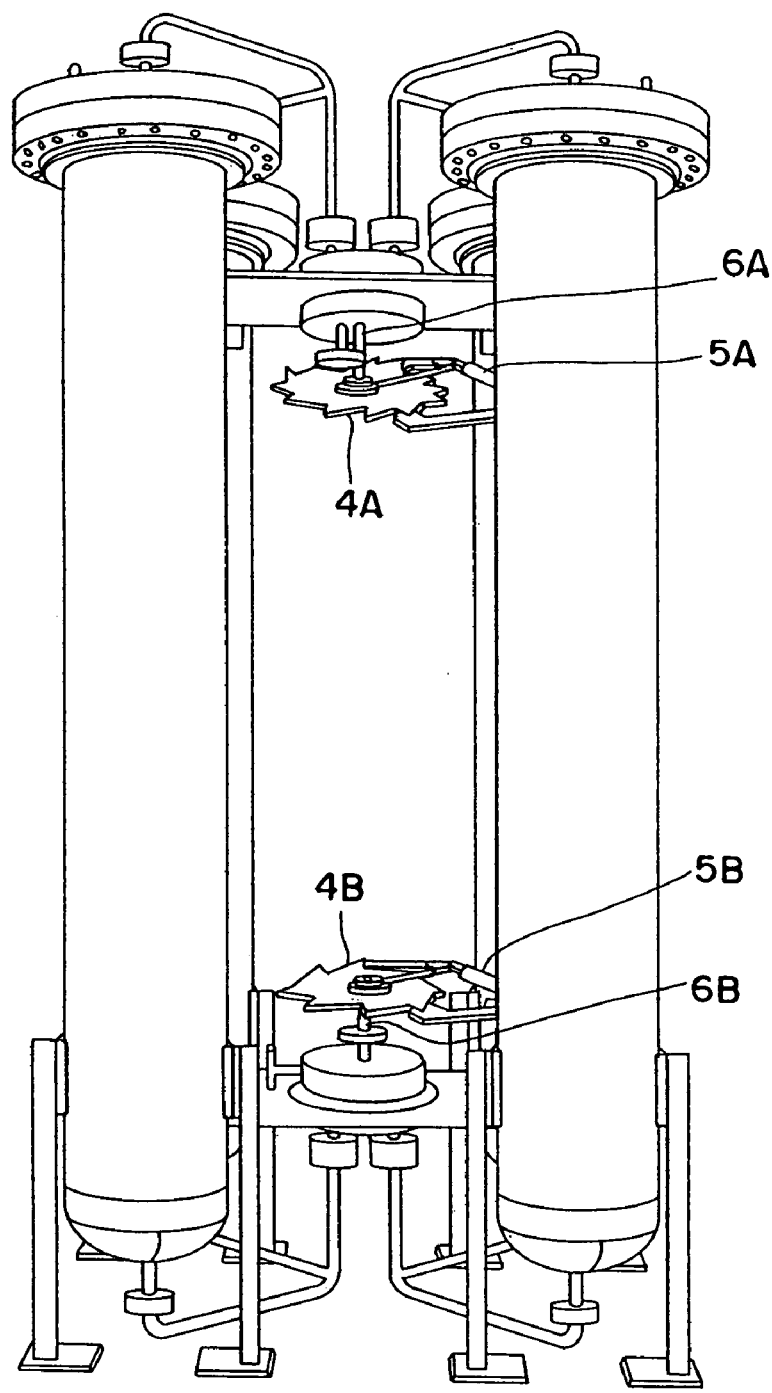
FIG. 19 is a four-bed PSA process using two separate rotary indexing valve trains driven by a separate source in accordance with the invention.

3) For 6-bed 12-step PSA Cycle of FIGS. 16A-16D (Table 5) that splits feed gas into unequal portions and feeds it to more than one adsorption vessel during start and stop phases of the adsorption step, but during remainder of the adsorption step it feeds all of the gas to only a single adsorption vessel
   feed valve—FIG. 18, orifices are sized to flow ⅔, 1 and ⅓ of the total feed gas to an adsorption vessel
   product valve—FIG. 17
   indexing mechanism—FIGS. 11 and 12 b) PSA apparatus shown in FIG. 19 (feed and product rotary valves driven by separate, decoupled indexing mechanisms)

Figure 3A:
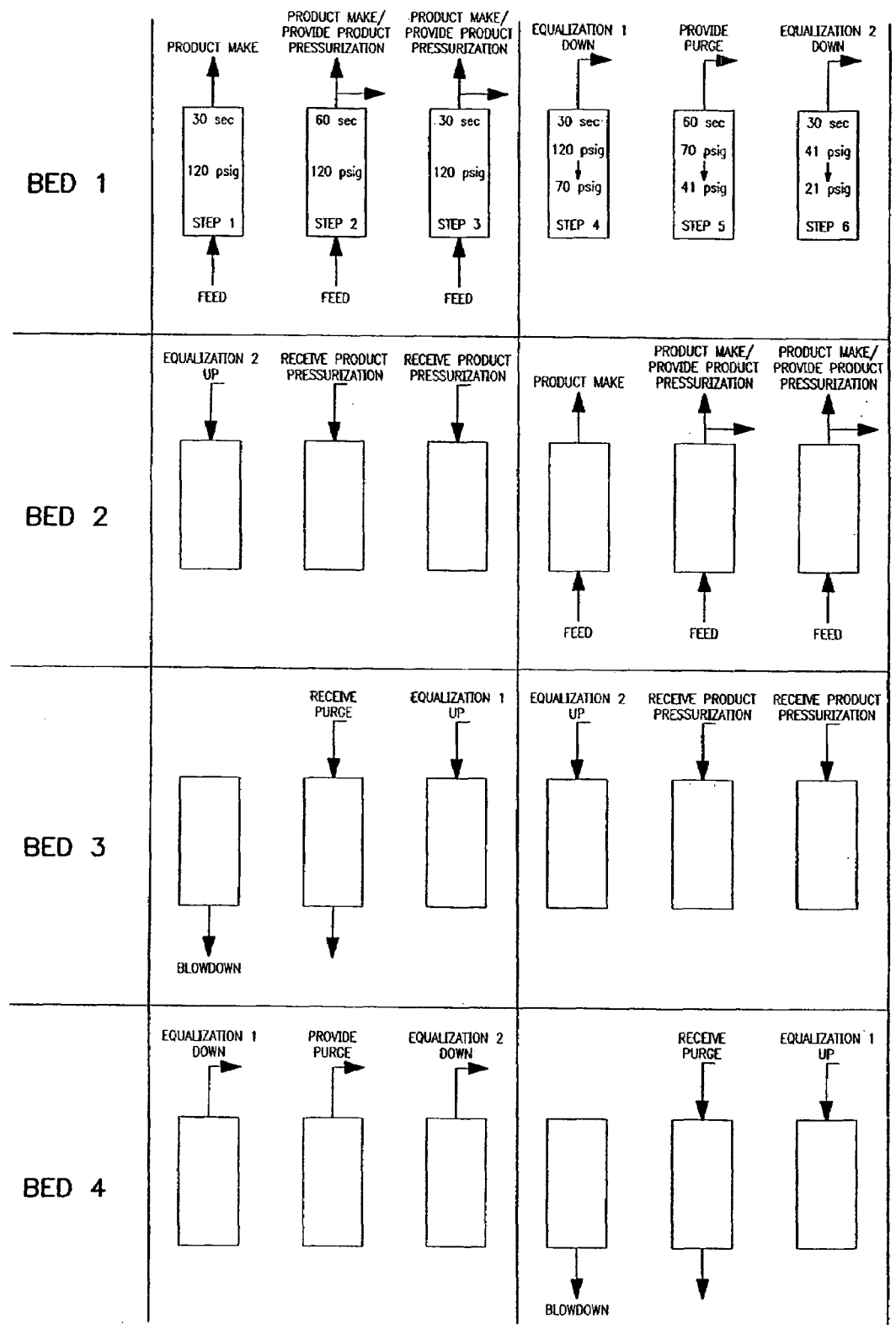
FIGS. 3A and 3B are a schematic of a four bed PSA column cycle with constant inlet flow rate, where
Figure 3B:
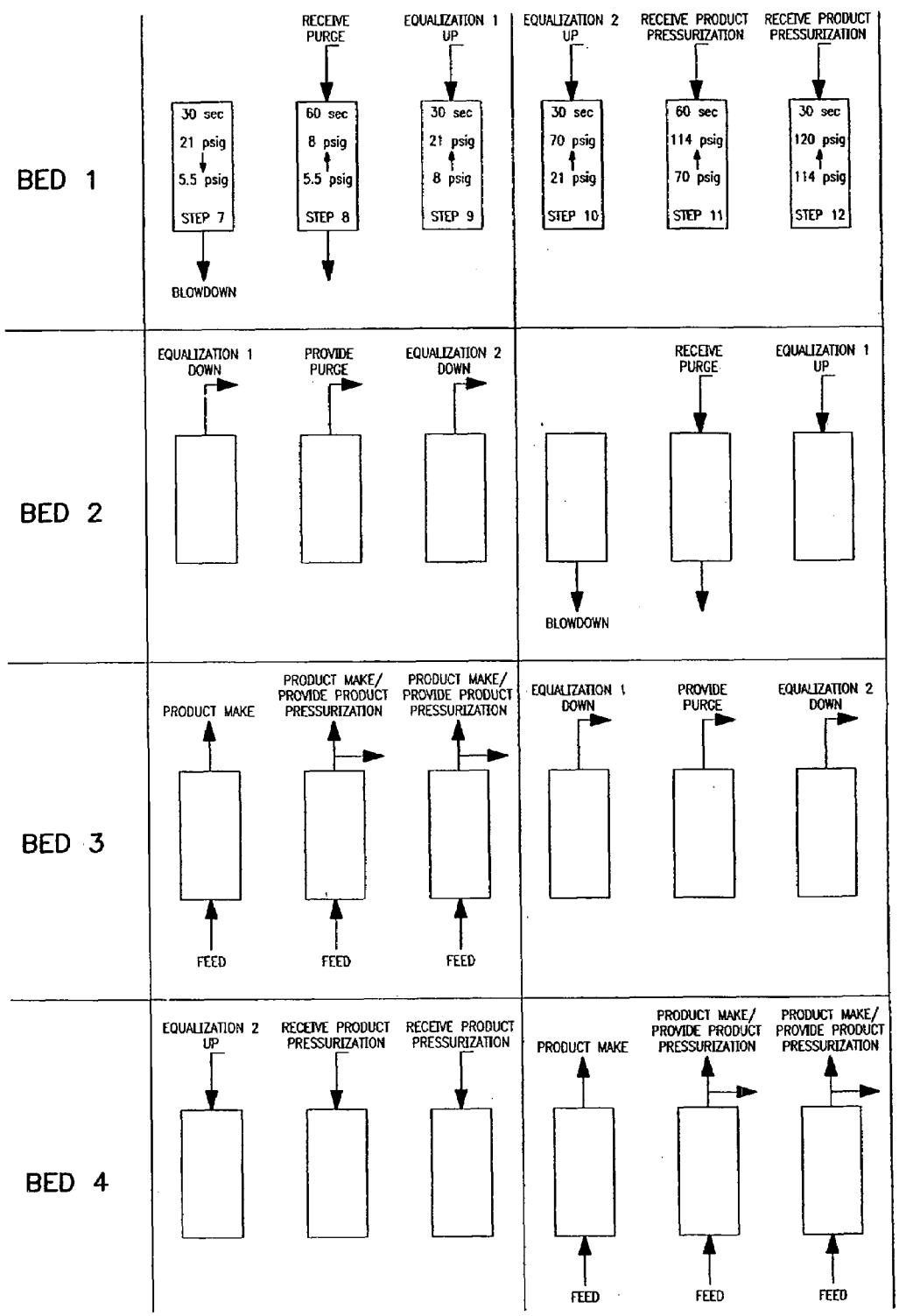
Figure 20:
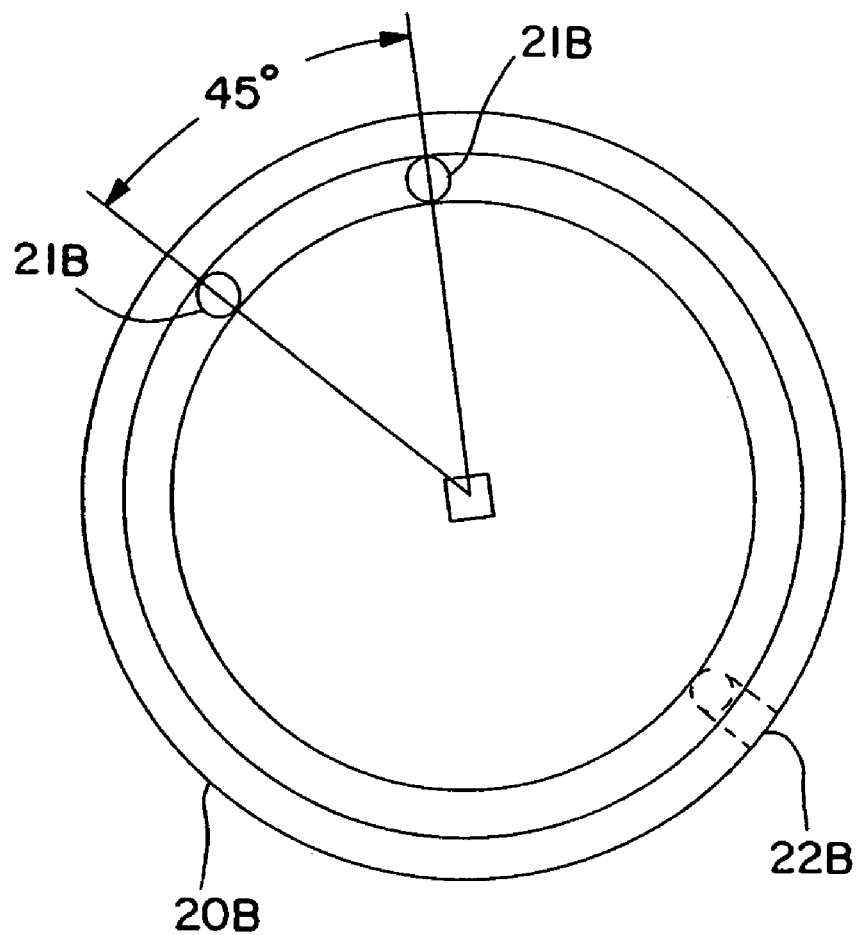
FIG. 20 is a schematic of the flow paths in the 45° indexing disk portion of the rotary feed multiport valve for a four-bed, 12-step PSA cycle using two rotary indexing valve trains driven by separate sources.
Figure 21:
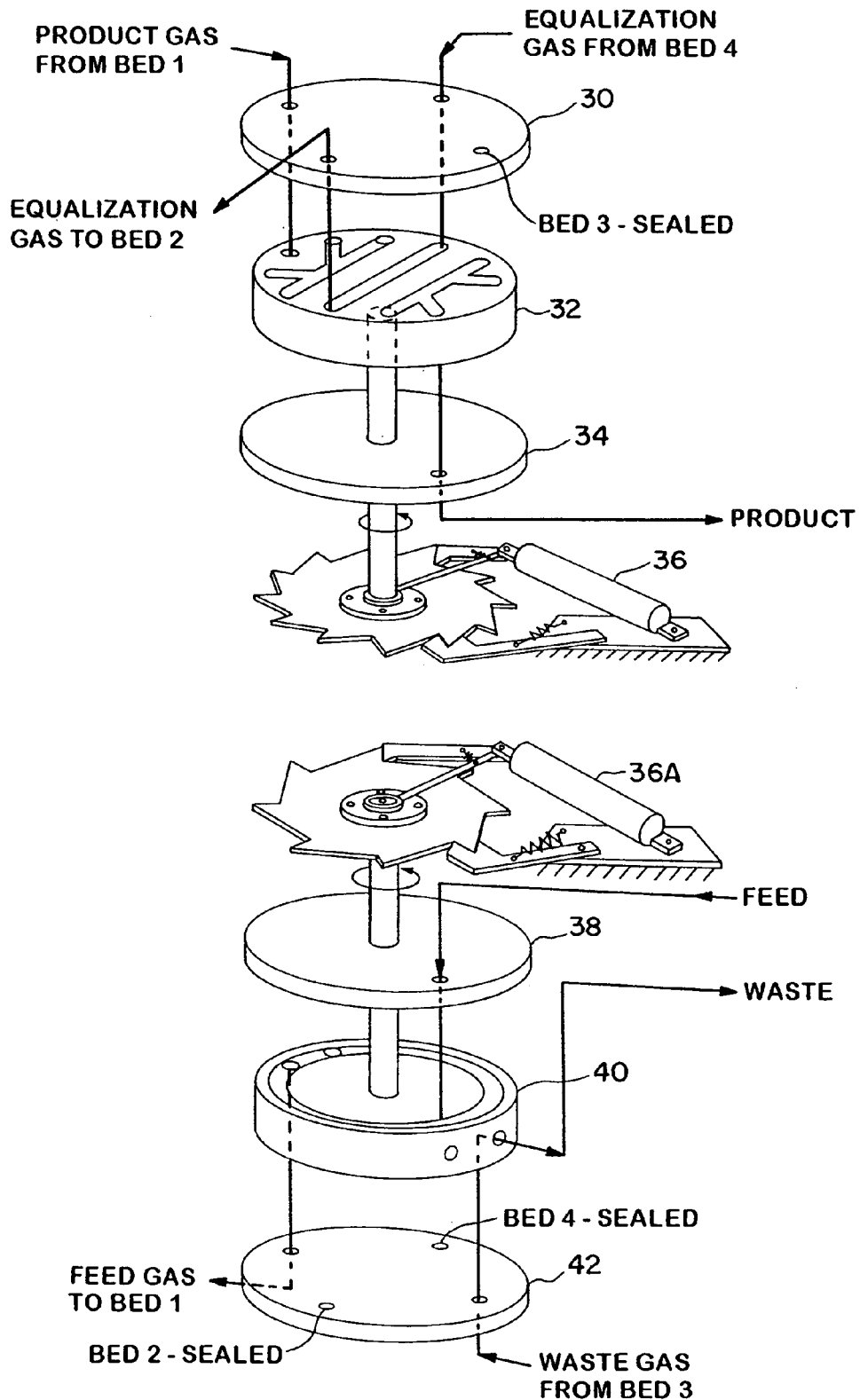
FIG. 21 is a schematic of the flow paths during STEP 1 of the PSA cycle depicted in FIG. 3 using the 30° product valve drive mechanism of FIG. 5 and the 45° feed valve mechanism of FIG. 20.
Figure 22:
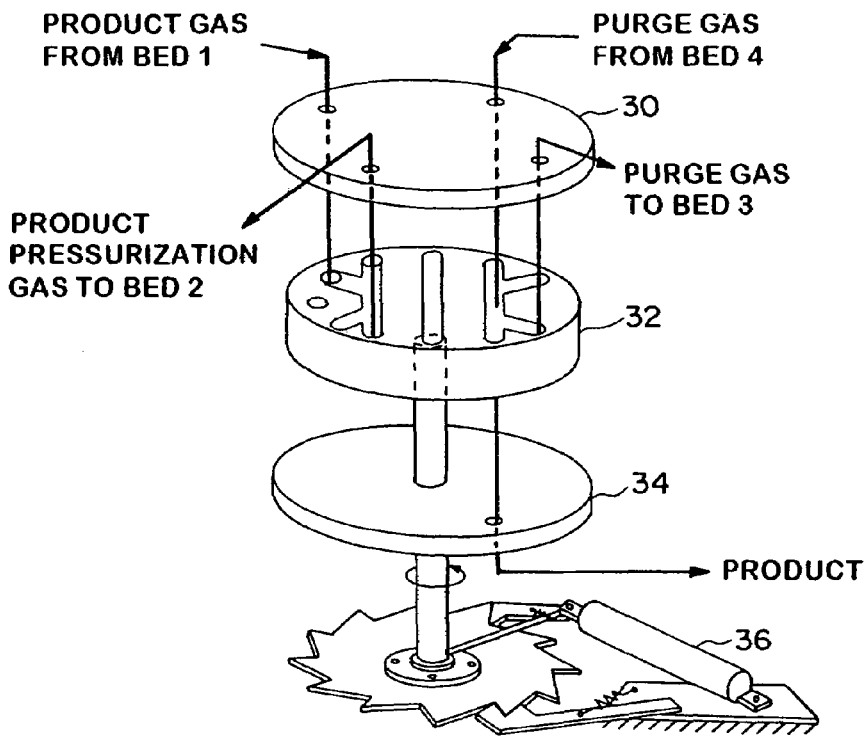
FIG. 22 is a schematic of the flow paths during STEP 2 of the PSA cycle depicted in FIG. 3 using the 30° product valve drive mechanism of FIG. 5 and the 45° feed valve mechanism of FIG. 20.
Figure 22:
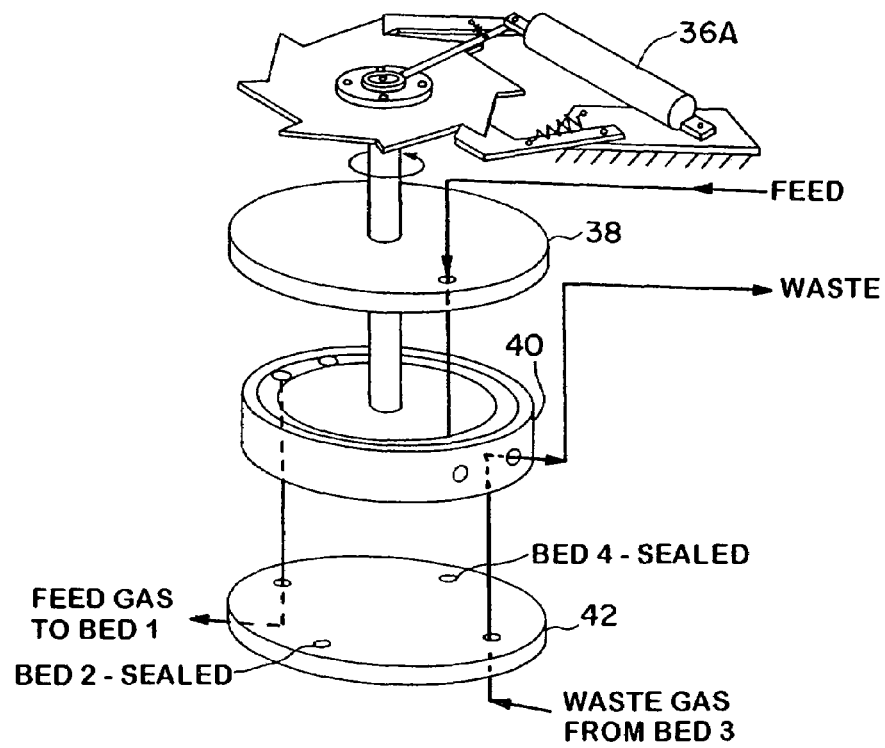
Figure 23:
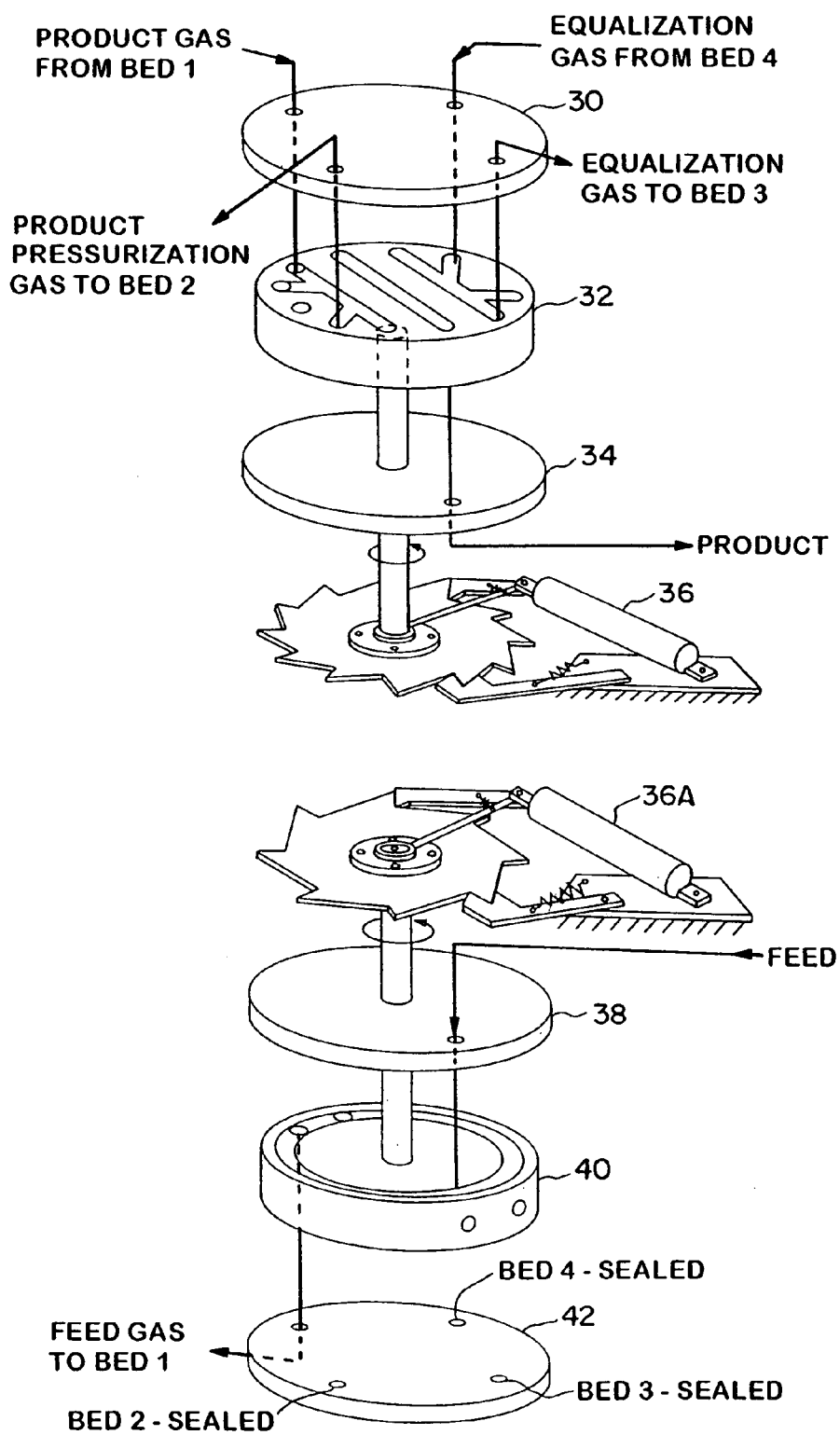
FIG. 23 is a schematic of the flow paths during STEP 3 of the PSA cycle depicted in FIG. 3 using the 30° product valve drive mechanism of FIG. 5 and the 45° feed valve mechanism of FIG. 20.
Figure 24:
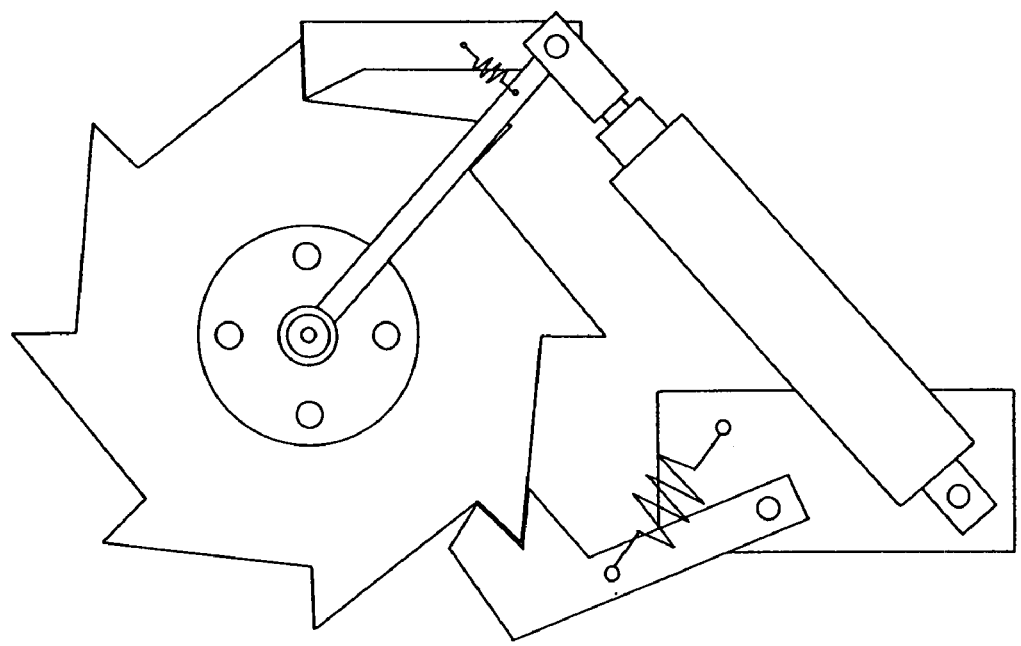
FIG. 24 is a schematic of a ratchet 45° indexing mechanism linearly actuated by an air cylinder.

1) For 4-bed 12-step PSA Cycle of FIGS. 3A and 3B (Table 1) that feeds all of the feed gas to a single adsorption vessel during an adsorption step
   feed valve—FIG. 20
   product valve—same as in FIG. 5
   step 1 flow paths—FIG. 21
   step 2 flow paths—FIG. 22
   step 3 flow paths—FIG. 23
   indexing mechanism—FIG. 24

Another aspect of the invention is a PSA process for recovering high purity hydrogen from feed mixtures comprising $H_2$, $H_2O$, CO, $CO_2$, hydrocarbons, nitrogen:

a) multiple-bed multi-step PSA cycle:
1) 4-bed 12-step PSA Cycle of FIGS. 3A and 3B (Table 1) that feeds all of the feed gas to a single adsorption vessel during an adsorption step;
2) 4-bed 12-step PSA Cycle of FIGS. 13A and 13B (Table 2) that splits feed gas into unequal portions and feeds it to more than one adsorption vessel during start and stop phases of the adsorption step, but during remainder of the adsorption step it feeds all of the gas to only a single adsorption vessel
3) 6-bed 12-step PSA Cycle of FIGS. 16A-16D (Table 5) that splits feed gas into unequal portions and feeds it to more than one adsorption vessel during start and stop phases of the adsorption step, but during remainder of the adsorption step it feeds all of the gas to only a single adsorption vessel;

b) PSA process in which feed gas flow to any one adsorption vessel during the time the bed is in communication with the feed gas source can range from zero to full flow;

c) PSA process in which duration of each step is selected for optimal performance The present invention will be described in detail with reference to FIGS. 2–15. FIG. 2 shows the details of the PSA process. Referring to FIG. 2, the pressure swing adsorption system comprises of four adsorption vessels (1) containing adsorbents, a rotary feed multiport valve (2), a rotary product multiport valve (3), a ratcheted indexing drive mechanism (4) that is actuated linearly by piston (5) and a common shaft (6). The bottom of each adsorption vessel 1 is connected to the rotary feed multiport valve 2 by a feed line 7, and the top of each adsorbent vessel 1 is connected to the rotary product multiport valve 3 by a product line 8. Feed gas enters the system through connection 9 on rotary feed valve 2, waste gas exits the system through connection 10 on rotary feed valve 2, and product gas exists the system through connection 11 on rotary product valve 3. The location of bed 1 with respect to FIG. 2 is arbitrary. Whichever bed is selected as bed 1, bed 2 is the next bed located counterclockwise with respect to bed 1, bed 3 is the next bed located counterclockwise with respect to bed 2 and so on. As described above, the rotary feed multiport valve 2 and rotary product multiport valve 3 are driven on a common shaft 6 by a single ratcheted indexing drive mechanism 4.

In the preferred mode of operation, FIG. 13 and Table 2, at certain times in the PSA cycle, two beds are receiving feed gas simultaneously, and at other times, only one bed receives all of the feed gas. The preferred mode PSA cycle is hereinafter referred to as variable bed inlet flow rate case. For simplicity and clarity, FIGS. 2–12 will be used to illustrate the apparatus/system features of the invention using constant bed inlet flow rate depicted in the PSA cycle of FIG. 3. Then, the key features of the preferred mode PSA process (variable bed inlet flow rate) will be disclosed by stating clearly the modifications that are required to practice the PSA cycle of FIG. 13 and Table 2.

Referring to FIGS. 2–12, the 12-step, 4-bed PSA cycle with constant bed inlet flow rate is described below.

Step 1 (FIGS. 3A & 8): Bed 1 is in the first adsorption step and making product gas at high pressure, while bed 3 is undergoing countercurrent blowdown, bed 4 is undergoing the first equalization falling step, and bed 2 is undergoing the second pressure equalization rising step.

Step 2 (FIGS. 3A & 9): Bed 1 is in the second adsorption step, making product gas, and is also supplying a slip stream of product gas to bed 2 that is undergoing the first product pressurization step. During the same time, beds 2, 3 and 4 are undergoing first product pressurization, purge, and cocurrent depressurization to provide purge gas to bed 3, respectively.

Step 3 (FIGS. 3A & 10): Bed 1 is in the third adsorption step, making product gas, and is also supplying a slip stream of product gas to bed 2 that is undergoing the second product pressurization step. During the same time period, beds 2, 3, and 4 are undergoing second product pressurization, the first equalization rising step, and second equalization falling, respectively.

Step 4 (FIG. 3A): Bed 1 is undergoing the first equalization falling step, while bed 3 receives the gas from bed 1 and is undergoing the second equalization rising step. Beds 2 and 4 are now undergoing the first adsorption step and blowdown, respectively.

Step 5 (FIG. 3A): Bed 1 is undergoing cocurrent depressurization step to provide purge gas to bed 4, while beds 2 and 3 are undergoing the second adsorption step and first product pressurization, respectively.

Step 6 (FIG. 3A): Bed 1 undergoes a second equalization falling step by sending low pressure equalization gas to bed 4 that is undergoing the first equalization rising step. Beds 2 and 3 are undergoing the third adsorption step and second product pressurization, respectively.

Step 7 (FIG. 3B): Beds 1 and 3 undergo the countercurrent blowdown and first adsorption step, respectively. During this time beds 2 and 4 are undergoing bed-to-bed equalization, i.e., beds 2 and 4 are undergoing the first equalization falling and second equalization rising steps, respectively.

Step 8 (FIG. 3B): Bed 1 is now receiving purge gas from bed 2, and beds 3 and 4 are undergoing the second adsorption step and first product pressurization step, respectively.

Step 9 (FIG. 3B): Bed 1 is undergoing the first equalization rising step by receiving low pressure equalization gas from bed 2 that is undergoing the second equalization falling step. During the same time, beds 3 and 4 is undergoing the third adsorption step and the second product pressurization, respectively.

Step 10 (FIG. 3B): Bed 1 is undergoing the second equalization rising step by receiving high pressure equalization gas from bed 3 that is undergoing the first equalization falling step. During the same time, beds 2 and 4 are undergoing the countercurrent blowdown and first adsorption step, respectively.

Step 11 (FIG. 3B): Bed 1 is receiving first product pressurization gas from bed 4 that is also in the second adsorption step, while bed 3 is undergoing cocurrent depressurization step to provide purge gas to bed 2.

Step 12 (FIG. 3B): Bed 1 is receiving second product pressurization gas from bed 4 that is also in the third adsorption step. During the same time, bed 3 undergoes a second equalization falling step by sending low pressure equalization gas to bed 2 that is undergoing the first equalization rising step.

Table 1 gives a summary of the fraction of the total feed flow to each bed during one complete PSA cycle of FIGS. 3A and 3B.

TABLE 1

Fraction of total feed flow rate to each bed during one PSA cycle
(four-bed PSA cycle of FIG. 3).

| Bed # | Step #1 | Step #2 | Step #3 | Step #4 | Step #5 | Step #6 | Step #7 | Step #8 | Step #9 | Step #10 | Step #11 | Step #12 |
|---|---|---|---|---|---|---|---|---|---|---|---|---|
| Bed 1 | 1 | 1 | 1 | 0 | 0 | 0 | 0 | 0 | 0 | 0 | 0 | 0 |
| Bed 2 | 0 | 0 | 0 | 1 | 1 | 1 | 0 | 0 | 0 | 0 | 0 | 0 |
| Bed 3 | 0 | 0 | 0 | 0 | 0 | 0 | 1 | 1 | 1 | 0 | 0 | 0 |
| Bed 4 | 0 | 0 | 0 | 0 | 0 | 0 | 0 | 0 | 0 | 1 | 1 | 1 |

Referring to Table 1, it is quite obvious that at any time in the PSA cycle of FIGS. 3A and 3B, only one bed receives the feed gas and the other bed is undergoing regeneration (e.g., blowdown, purging, equalization and product pressurization). In the preferred mode of operation (FIGS. 13A and 13B and Table 2), at certain times in the PSA cycle, two beds are receiving feed gas and at other times, only one bed receives all of the feed gas.

Figure 4:
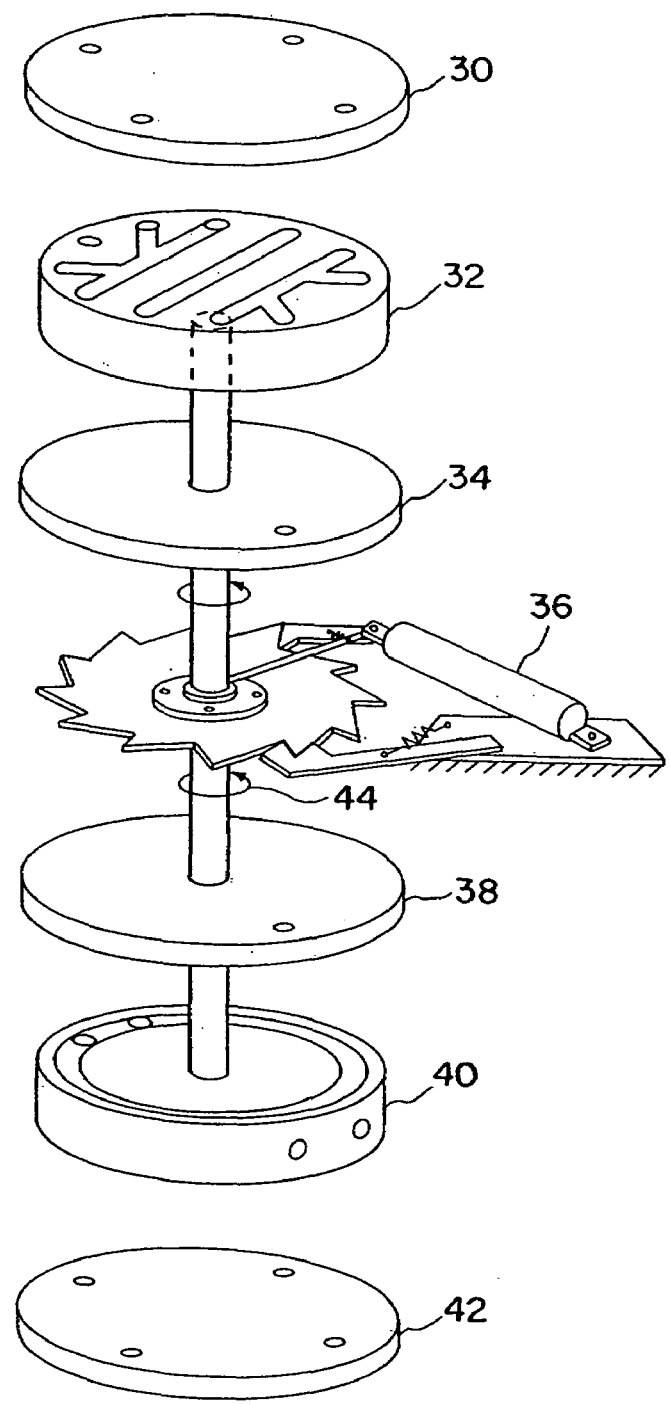
FIG. 4 is an exploded view of the product and feed valves.

FIG. 4 shows an exploded view of both the product valve and feed valve. Each valve consists of a rotating disk sandwiched between an upper and lower stationary disk. As shown, 30 is a product valve upper stationary disc, 32 is a product valve rotatable disk, 34 is a product valve lower stationary disk, 36 is an indexing drive mechanism, 38 is a feed valve stationary disk, 40 is a feed valve rotatable disk, 42 is a feed valve lower stationary disk and 44 is a rotatable shaft. These components appear in other drawings and their reference number shall remain the same.

Using the PSA cycle of FIGS. 3A and 3B, the features of the product side rotary valve is shown in FIG. 5. Referring to FIG. 5, the product valve rotating disk 12 is made up of several flow channels. As the disk rotates in 30° increments, the product flow streams for a given cycle step are established. Through holes 13 are used to allow product make gas to flow from the top of the bed, through the valve disk, and finally out of the system. Channels 14 and 15 are used for providing and receiving product pressurization gas, channel 16 is used for equalization 1 down and equalization 2 up gas, channel 17 is used for equalization 2 down and equalization 1 up gas, and channel 18 is used for providing and receiving purge gas. Flow adjustment valves 19 are built into each channel in order to adjust the flows and ultimately the pressure profiles in each bed for a given cycle step. These valves may be a fixed orifice or externally adjustable.

Similarly, the feed valve rotating disk 20A is made up of several flow channels as shown in FIG. 6. As the disk rotates in 30° increments, the feed flow streams for a given cycle step are established. Thru holes 21A are used to allow feed gas to flow from outside the system, through the valve disk, and finally into the bottom of the bed. Channels 22A is used to allow waste gas to flow from the bottom of the bed, through the valve disk, and finally out of the system. FIG. 7 shows how the upper and lower valve ports connect with the adsorption vessels/beds during Step 1 of the PSA cycle shown in FIG. 3A. FIG. 8 shows the features of FIG. 7 without the beds during Step 1 of the PSA cycle shown in FIG. 3A. FIGS. 8–10 are more detailed descriptions of PSA steps 1–3 respectively, illustrating how such rotary valves would interact with each adsorption vessel using the PSA cycle of FIG. 3A. Shown on FIGS. 8–10 are the specific flow paths through a rotary feed valve and a rotary product valve, which in this case are connected by a common shaft and driven by a common ratcheted indexing mechanism.

The PSA process of this invention uses a ratchet indexing drive mechanism to rotate the feed and product multiport rotary valves, using intermittent-motion. An intermittent-motion mechanism is a linkage which converts continuous motion into intermittent motion. Indexing a shaft means rotating it through a specific angle with zero velocity at the beginning and the end. Additional details of such means are given by Martin, George H., "Kinematics and Dynamics of Machines", $2^{nd}$ ed., McGraw Hill Series in Mechanical Engineering, 1982.

Ratchet mechanisms are used to transform motion of rotation or translation into intermittent rotation or translation and therefore presents a highly flexible approach to rotating a PSA rotary valve through specific angles. In FIG. 11, the pawl is used to advance the toothed wheel. As the pawl lever is made to oscillate, the toothed wheel will rotate counter-clockwise 30° with an intermittent motion as shown in FIG. 12. An optional holding pawl may be used to prevent the toothed wheel from reversing and to insure position repeatability. In the example described in this invention, the pawl level is made to oscillate through the use of an oscillating linear motion.

In the preferred mode (variable bed inlet flow rate case), the four bed PSA cycle of FIGS. 13A and 13B is used instead of FIGS. 3A and 3B, and the multiports depicted in FIGS. 5 and 6 are replaced by FIGS. 14 and 15.

The product valve rotating disk 25 channels can be modified as shown in FIG. 14 for use in the PSA cycle of FIG. 13. Thru holes 26 are used to allow product make gas to flow from the top of the bed, through the valve disk, and finally out of the system. Channels 27 and 28 are used for providing and receiving product pressurization gas, channel 29 is used for providing and receiving purge gas, and channel 30 is used for equalization down and equalization up gas. Flow adjustment valves 31 are built into each channel in order to adjust the flows and ultimately the pressure profiles in each bed for a given cycle step. These valves may be a fixed orifice or externally adjustable.

In FIG. 15, the feed valve rotating disk 32 channels for a 12-step, 4-bed PSA cycle with variable bed velocity which can be modified as shown, are for use in the PSA cycle of FIG. 13. Thru holes 33, 34 and 35 are used to allow ⅓, ⅔ and full flow, respectively, of the feed gas to flow from outside the system, through the valve disk, and finally into the bottom of the bed. Channels 36 are used to allow waste gas to flow from the bottom of the bed, through the valve disk, and finally out of the system.

Referring to FIGS. 13–15, the 12-step, 4-bed PSA cycle with variable inlet feed flow rate can be described as follows:

Step 1: Bed 1 is in the second adsorption step at ⅔ feed flow, making product gas, and is also supplying a slip stream of product gas to bed 2 that is undergoing the first product pressurization step. While bed 3 is undergoing countercurrent blowdown, bed 4 is undergoing the fifth adsorption step at ⅓ feed flow, is also making product gas at high pressure, and is also supplying a slip stream of product gas to bed 2.

Step 2: Bed 1 is in the third adsorption step at full feed flow, making product gas, and is also supplying a slip stream of product gas to bed 2 that is undergoing the second product pressurization step. During the same time, bed 4 is undergoing cocurrent depressurization by providing purge gas to bed 3.

Step 3: Bed 1 is in the fourth adsorption step at ⅔ feed flow and making product gas. Bed 2 is in the first adsorption step at ⅓ feed flow and is also making product gas. During the same time period, beds 3 and 4 are undergoing equalization rising step and equalization falling step, respectively.

Step 4: Bed 1 is in the fifth adsorption step at ⅓ feed flow, making product gas, and is also supplying a slip stream of product gas to bed 3 that is undergoing the first product pressurization step. Bed 2 is in the second adsorption step at ⅔ feed flow, making product gas, and is also supplying a slip stream of product gas to bed 3. Bed 4 is now undergoing blowdown.

Step 5: Bed 1 is undergoing co-current depressurization step by providing purge gas to bed 4. Bed 2 is undergoing the third adsorption step at full feed flow, making product gas, and supplying a slip stream of product gas to bed 3 which is undergoing the second product pressurization.

Step 6: Bed 1 undergoes an equalization falling step by sending low pressure equalization gas to bed 4 that is undergoing the equalization rising step. Beds 2 and 3 are undergoing the fourth adsorption step at ⅔ feed flow and first adsorption step at ⅓ feed flow, respectively. Beds 2 and 3 are both making product gas.

Step 7: Bed 1 undergoes countercurrent blowdown. During this time beds 2 and 3 undergo the fifth adsorption step at ⅓ feed flow and second adsorption step at ⅔ feed flow, respectively. Beds 2 and 3 both make product gas and supply a slip steam of product gas to bed 4 which is undergoing the first product pressurization.

Step 8: Bed 1 is now receiving purge gas from bed 2, and beds 3 and 4 are undergoing the third adsorption step at full feed flow and second product pressurization step, respectively.

Step 9: Bed 1 is undergoing the equalization rising step by receiving equalization gas from bed 2. During the same time, beds 3 and 4 are undergoing the fourth adsorption step at ⅔ feed flow and the first adsorption step at ⅓ feed flow, respectively.

Step 10: Bed 1 is receiving the first product pressurization from beds 3 and 4. During the same time, bed 2 is undergoing countercurrent blowdown, and beds 3 & 4 are undergoing the fifth adsorption step at ⅓ feed flow and the second adsorption step at ⅔ feed flow, respectively.

Step 11: Bed 1 is receiving the second product pressurization gas from bed 4 that is also in the third adsorption step at full feed flow, while bed 3 is undergoing cocurrent depressurization step to provide purge gas to bed 2.

Step 12: Bed 1 is in the first adsorption step at ⅓ feed flow and making product. During the same time, bed 3 undergoes an equalization falling step by sending equalization gas to bed 2 that is undergoing the equalization rising step. Bed 4 is undergoing the fourth adsorption step at ⅔ feed flow and is also making product gas.

The indexing motion of these modified valves throughout the cycle steps is essentially the same as illustrated in FIGS. 8–10.

Table 2 gives a summary of the fraction of the total feed flow to each bed during one complete PSA cycle of FIGS. 13A and 13B.

TABLE 2

Fraction of total feed flow rate to each bed during one PSA cycle (four bed PSA cycle of FIG. 13).

| Bed # | Step #1 | Step #2 | Step #3 | Step #4 | Step #5 | Step #6 | Step #7 | Step #8 | Step #9 | Step #10 | Step #11 | Step #12 |
|---|---|---|---|---|---|---|---|---|---|---|---|---|
| Bed 1 | ⅔ | 1 | ⅔ | ⅓ | 0 | 0 | 0 | 0 | 0 | 0 | 0 | ⅓ |
| Bed 2 | 0 | 0 | ⅓ | ⅔ | 1 | ⅔ | ⅓ | 0 | 0 | 0 | 0 | 0 |
| Bed 3 | 0 | 0 | 0 | 0 | 0 | ⅓ | ⅔ | 1 | ⅔ | ⅓ | 0 | 0 |
| Bed 4 | ⅓ | 0 | 0 | 0 | 0 | 0 | 0 | 0 | ⅓ | ⅔ | 1 | ⅔ |

Examples of the four bed PSA process performance using the PSA process of FIGS. 2–12 and Table 1 are given in Tables 3 & 4. In Table 3, lower pressure and feed flow rate are used relative to those used in Table 4. In the table, the symbols have the following meaning: TPD=ton (2000 lb) per day of hydrogen, kPa=1000 Pa=S.I. unit for pressure (1.0 atm.=1.01325 bars=101.325 kPa), s=time unit in seconds.

TABLE 3

An example of the operating conditions and the PSA process performance using the aforementioned four bed PSA process of FIG. 3 and Table 1.

| | |
|---|---|
| Cycle time (s) | 364 |
| Adsorbent in first layer of Bed: | Alumina |
| Amount of alumina (lb/TPD $H_2$): | $1.284 \times 10^3$ |
| Adsorbent in second layer of bed: | activated carbon |
| Amount of activated carbon (lb/TPD $H_2$): | $4.035 \times 10^3$ |
| Adsorbent in third layer of bed: | VSA6 zeolite |
| Amount of zeolite (lb/TPD $H_2$): | $2.911 \times 10^3$ |
| High Pressure: | $7.954 \times 10^2$ kPa |
| Low Pressure: | $1.445 \times 10^2$ kPa |
| Feed Flow rate: | 119.0 cfh-NTP |
| Hydrogen Purity: | 99.990% |
| Hydrogen Recovery: | 69.4% |
| Total Bed Size Factor (lb/TPD $H_2$): | $8.230 \times 10^3$ |
| Temperature: | 309.4 K |

The results shown above were obtained from PSA pilot plant using a feed mixture on a dry basis: 77.85% $H_2$, 18.60% $CO_2$, 0.66% CO, 2.30% $CH_4$ and 0.60 $N_2$. Also, in the table, total bed size factor is the total quantity of adsorbents per ton per day of $H_2$ produced. The bed internal diameter is 2.1575 inches (0.0548 m).

TABLE 4

An example of the operating conditions and the PSA process performance using the aforementioned four bed PSA process of FIG. 3 and Table 1.

| | |
|---|---|
| Cycle time (s) | 480 |
| Adsorbent in first layer of Bed: | Alumina |
| Amount of alumina (lb/TPD $H_2$): | $1.161 \times 10^3$ |
| Adsorbent in second layer of bed: | activated carbon |
| Amount of activated carbon (lb/TPD $H_2$): | $3.649 \times 10^3$ |
| Adsorbent in third layer of bed: | VSA6 zeolite |
| Amount of zeolite (lb/TPD $H_2$): | $2.632 \times 10^3$ |
| High Pressure: | $9.326 \times 10^2$ kPa |
| Low Pressure: | $1.385 \times 10^2$ kPa |
| Feed Flow rate: | 123.3 cfh-NTP |
| Hydrogen Purity: | >99.990% |
| Hydrogen Recovery: | 74.4% |
| Total Bed Size Factor (lb/TPD H2): | $7.442 \times 10^3$ |
| Temperature: | 309.9 K |

The results shown above were obtained from PSA pilot plant using a feed mixture on a dry basis: 77.53% $H_2$, 18.88% $CO_2$, 0.74% CO, 2.25% $CH_4$ and 0.60 $N_2$. Also, in the table, total bed size factor is the total quantity of adsorbents per ton per day of $H_2$ produced. The bed internal diameter is 2.1575 inches (0.0548 m).

Although the above PSA process is discussed in relation to $H_2$ production, the aforementioned key features could also be extended to other separation processes, e.g. helium purification, air separation, natural gas upgrading, $CO_2$ production from synthesis gas or other sources containing $CO_2$ in the feed, or in other PSA processes for co-production of $H_2$ and CO.

Also, other adsorbents, including activated carbons with different bulk densities and other zeolitic materials such as Li—X zeolite, CaX(2.0), etc could be used in the PSA separation process without deviating from the scope of the invention. For example, other zeolites such as CaX (2.0) and naturally occurring crystalline zeolite molecular sieves such as chabazite, erionite and faujasite could be used in the PSA process of this invention. Furthermore, zeolite containing lithium/alkaline earth metal A and X zeolites (Chao et al., U.S. Pat. Nos. 5,413,625; 5,174,979; 5,698,013; 5,454,857 and 4,859,217) may also be used in this invention.

Also, each of the layered adsorbent zone in each of the PSA bed could be replaced with layers of adsorbents of the same type. For example, the single layer of zeolite in each bed could be replaced with multiple layers of different adsorbents (e.g., VSA 6 could be replaced by a first layer of 13x with VSA6 on top). In addition, the zeolite layer could be substituted by a composite adsorbent layer containing different adsorbent materials positioned in separate zones in which temperature conditions favor adsorption performance of the particular adsorbent material under applicable processing conditions in each zone. Further details on composite adsorbent layer design is given by Notaro et al., U.S. Pat. No. 5,674,311.

Although the variable bed inlet flow rate PSA cycle is disclosed with respect to flows being ⅓, ⅔ or full flows, other fraction of the total flow rate could be used without deviating from the scope of this invention. In addition, less than four or more than four beds could be used in the invention by modifying the multiport plates of FIGS. 5 & 6 or 14 & 15.

In the case of 12-step, 6-bed PSA process, the following discloses how the features of the variable bed inlet flow rate will work using the PSA cycle of FIGS. 16A-16D. The product valve for use with the 12-step, 6-bed PSA process of FIGS. 16A-16D is shown in FIG. 17. Thru holes 38 are used to allow product make gas to flow from the top of the bed, through the valve disk, and finally out of the system. Channels 39 and 40 are used for providing and receiving product pressurization gas, channel 41 is used for equalization 1 down and equalization 2 up gas, channel 42 is used for equalization 2 down and equalization 1 up gas, and channel 43 is used for providing and receiving purge gas. Flow adjustment valves 44 are built into each channel in order to adjust the flows and ultimately the pressure profiles in each bed for a given cycle step. These valves may be a fixed orifice or externally adjustable. Also, FIG. 18 shows the feed valve for use with the 12-step, 6-bed PSA process of FIGS. 16A-16D. Thru holes 46, 47 and 48 are used to allow ⅔, full flow, and ⅓, respectively, of the feed gas to flow from outside the system, through the valve disk, and finally into the bottom of the bed. Channels 49 are used to allow waste gas to flow from the bottom of the bed, through the valve disk, and finally out of the system. The indexing motion of these modified valves throughout the cycle steps is essentially the same as illustrated in FIGS. 8–10.

Referring to FIGS. 16–18, The 12-step, 6-bed PSA cycle with variable bed velocity can be described as follows:

Step 1: Bed 1 is in the first adsorption step at ⅔ feed flow, making product gas, and is also supplying a slip stream of product gas to bed 2 that is undergoing the first product pressurization step. While bed 3 is undergoing first equalization up receiving gas from bed 5 which is undergoing second equalization down. Bed 4 is undergoing countercurrent blowdown. Bed 6 is undergoing the third adsorption step at ⅓ feed flow, is making product gas, and is also supplying a slip stream of product gas to bed 2.

Step 2: Bed 1 is in the second adsorption step at full feed flow, making product gas, and is also supplying a slip stream of product gas to bed 2 that is undergoing the second product pressurization step. During the same time, bed 3 is undergoing second equalization up receiving gas from bed 6 which is undergoing first equalization down. Bed 5 is undergoing cocurrent depressurization by providing purge gas to bed 4.

Step 3: Bed 1 is in the third adsorption step at ⅓ feed flow, is making product gas, and is also supplying a slip stream of product gas to bed 3 that is undergoing the first product pressurization step. Bed 2 is in the first adsorption step at ⅔ feed flow, is making product gas, and is also supplying a slip stream of product gas to bed 3. During the same time period, beds 4 and 6 are undergoing first equalization rising step and second equalization falling step, respectively. Bed 5 is now undergoing countercurrent blowdown.

Step 4: Bed 1 is in the first equalization falling step, providing gas to bed 4 which is undergoing the second equalization rising step. Bed 2 is in the second adsorption step at full feed flow, making product gas, and is also supplying a slip stream of product gas to bed 3 which is undergoing the second product pressurization step. Bed 6 is undergoing cocurrent depressurization step by providing purge gas to bed 5.

Step 5: Bed 1 is in the second equalization falling step, providing gas to bed 5 which is undergoing the first equalization rising step. Bed 2 is undergoing the third adsorption step at ⅓ feed flow, making product gas, and supplying a slip stream of product gas to bed 4 which is undergoing the first product pressurization. Bed 3 is in the first adsorption step at ⅔ feed flow and is also making product gas, and is also supplying a slip stream of product gas to bed 4. Bed 6 is now undergoing countercurrent blowdown.

Step 6: Bed 1 is undergoing co-current depressurization step by providing purge gas to bed 6. During the same time period, beds 2 and 5 are undergoing first equalization falling step and second equalization rising step, respectively. Bed 3 is in the second adsorption step at full feed flow, making product gas, and is also supplying a slip stream of product gas to bed 4 which is undergoing the second product pressurization step.

Step 7: Bed 1 is undergoing countercurrent blowdown. During this time, beds 2 and 6 undergo second equalization falling step and first equalization rising step, respectively. Bed 3 is undergoing the third adsorption step at ⅓ feed flow, making product gas, and supplying a slip stream of product gas to bed 5 which is undergoing the first product pressurization. Bed 4 is in the first adsorption step at ⅔ feed flow, is making product gas, and is also supplying a slip stream of product gas to bed 5.

Step 8: Bed 1 is now receiving purge gas from bed 2. During this time, beds 3 and 6 undergo first equalization falling step and second equalization rising step, respectively. Bed 4 is in the second adsorption step at full feed flow, making product gas, and is also supplying a slip stream of product gas to bed 5 which is undergoing the second product pressurization step.

Step 9: Bed 1 is undergoing the first equalization rising step by receiving equalization gas from bed 3 which is undergoing the second equalization falling step. Bed 2 is now undergoing countercurrent blowdown. During the same time, beds 4 and 5 are undergoing the third adsorption step at ⅓ feed flow and the first adsorption step at ⅔ feed flow, respectively and providing product pressurization gas to bed 6.

Step 10: Bed 1 is undergoing the second equalization rising step by receiving equalization gas from bed 4 which is undergoing the first equalization falling step. Bed 3 is undergoing cocurrent depressurization step by providing purge gas to bed 2. Bed 5 is in the second adsorption step at full feed flow, making product gas, and is also supplying a slip stream of product gas to bed 6 which is undergoing the second product pressurization step.

Step 11: Bed 1 is receiving the first product pressurization from beds 5 and 6. During this time, beds 2 and 4 undergo first equalization rising step and second equalization falling step, respectively. Bed 3 is now undergoing countercurrent blowdown. Beds 5 and 6 are undergoing the third adsorption step at ⅓ feed flow and the first adsorption step at ⅔ feed flow, respectively.

Step 12: Bed 1 is receiving the second product pressurization gas from bed 6 that is also in the second adsorption step at full flow and making product. During this time, beds 2 and 5 undergo second equalization rising step and first equalization falling step, respectively, while bed 4 is undergoing cocurrent depressurization step to provide purge gas to bed 3.

Table 5 gives a summary of the fraction of the total feed flow to each bed during one complete PSA cycle of FIG. 16.

Alternatively, separate drives could be used for the feed and product rotary valves. Referring to FIG. 2, the rotary feed multiport valve 2 and rotary product multiport valve 3 are driven on a common shaft 6 by a single ratcheted indexing drive mechanism 4. A variation of this approach is to drive each rotary multiport valve with a separate ratcheted indexing drive mechanism 4A and 4B, actuated linearly by pistons 5A and 5B, connected to individual shafts 6A and 6B as shown in FIG. 19. Driving the rotary valves with a common ratcheted mechanism connected to a common shaft offers less cycle flexibility and adds more complexity to the valve porting. Decoupling the feed valve from the product valve offers the greatest cycle flexibility, simplifies the valve porting, lowers the unit product cost in PSA process but adds additional parts. In either case, there will be greater flexibility in this PSA apparatus than in prior art rotating multiport valves.

In FIGS. 8–10, valve positions on both the feed and product side are based on 30° increments with use of a common ratcheted drive mechanism as shown in FIG. 11. Any reasonable angle could be employed. By using a common drive and valve shaft, extra porting on the feed valve is required because, by the very nature of a common shaft, it rotates on every step. The nature of the 4-bed PSA cycle described in this invention does not require the feed valve to rotate when going from steps 1–2, 4–5, 7–8, and 10–11. As an example, FIG. 6 depicts the use of three thru holes 21A and two waste flow channels 22A, so that feed and waste flows are not interrupted when going from steps 1–2, 4–5, 7–8, and 10–11. Minor interruptions in feed and waste flows may occur as the valve moves into position, but this effect can by minimized by adding slotted holes in the valve porting or installing feed buffer and waste buffer tanks.

FIGS. 21–23 are also detailed descriptions of PSA steps 1–3, but in this case, the rotary feed and rotary product valves are decoupled and driven by separate ratcheted indexing mechanisms. Because of the inherent symmetry of the system in either case, only detail descriptions of steps 1–3 are necessary to further describe steps 4–6, 7–9, 10–12 of FIG. 3.

Step 1 (FIGS. 3A & 21): Bed 1 is in the first adsorption step and making product gas at high pressure, while bed 3 is undergoing countercurrent blowdown, bed 4 is undergoing the first equalization falling step, and bed 2 is undergoing the second pressure equalization rising step.

Step 2 (FIGS. 3A & 22): Bed 1 is in the second adsorption step, making product gas, and is also supplying a slip stream of product gas to bed 2 that is undergoing the first product pressurization step. During the same time, beds 2, 3 and 4

TABLE 5

Fraction of total feed flow rate to each bed during one PSA cycle (six bed PSA cycle of FIG. 16).

| Bed # | Step #1 | Step #2 | Step #3 | Step #4 | Step #5 | Step #6 | Step #7 | Step #8 | Step #9 | Step #10 | Step #11 | Step #12 |
|---|---|---|---|---|---|---|---|---|---|---|---|---|
| Bed 1 | ⅔ | 1 | ⅓ | 0 | 0 | 0 | 0 | 0 | 0 | 0 | 0 | 0 |
| Bed 2 | 0 | 0 | ⅔ | 1 | ⅓ | 0 | 0 | 0 | 0 | 0 | 0 | 0 |
| Bed 3 | 0 | 0 | 0 | 0 | ⅔ | 1 | ⅓ | 0 | 0 | 0 | 0 | 0 |
| Bed 4 | 0 | 0 | 0 | 0 | 0 | 0 | ⅔ | 1 | ⅓ | 0 | 0 | 0 |
| Bed 5 | 0 | 0 | 0 | 0 | 0 | 0 | 0 | 0 | ⅔ | 1 | ⅓ | 0 |
| Bed 6 | ⅓ | 0 | 0 | 0 | 0 | 0 | 0 | 0 | 0 | 0 | ⅔ | 1 | are undergoing first product pressurization, purge, and cocurrent depressurization to provide purge gas to bed 3, respectively.

Step 3 (FIGS. 3A & 23): Bed 1 is in the third adsorption step, making product gas, and is also supplying a slip stream of product gas to bed 2 that is undergoing the second product pressurization step. During the same time period, beds 2, 3, and 4 are undergoing second product pressurization, the first equalization rising step, and second equalization falling, respectively.

In FIGS. 21–23, the product valve is based on 30° increments (36), and by using separate ratcheted drives ratchet 36 and ratchet 36A, the feed valve can be simplified to rotate in 45° increments (36A). Again, any reasonable angles could be employed. In this case, the product valve is driven by the 12 tooth ratcheted mechanism as shown in FIG. 11, and the feed valve is driven by the 8 tooth ratcheted mechanism as shown in FIG. 24. By decoupling the valves, the porting of the 45° feed valve becomes simpler as shown in FIG. 20. Only two thru holes 21B and one waste flow channel 22B is now required because the valve remains stationary, while the product valve rotates, when going from steps 1–2, 4–5, 7–8, and 10–11. Thus, the 45° indexing feed valve moves less frequently, the minor interruptions in feed and waste flows between steps 1–2, 4–5, 7–8, 10–11, as the valve moves into position are completely eliminated. Finally, this arrangement also allows greater cycle flexibility in the timing and duration of overlapping steps between the top and bottom of the beds.

Although FIG. 11 depicts this oscillation linear motion with use of a single acting air cylinder on a pivot, one skilled in the art could use a linear motor or solenoid plunger on a pivot to create the same linear motion. The driving cylinder could be electrical, pneumatic or hydraulic.

While the preferred embodiments of this invention have been disclosed, various modes of carrying out the principles disclosed herein are contemplated as being within the scope of the following claims. Therefore, it is understood that the scope of the invention is not to be limited except as otherwise set forth in the claims.

What is claimed:

1. An indexing rotary dual valve for use in a pressure swing adsorption system (PSA) having at least two beds operating in multiple steps in a PSA cycle comprising:
    a first valve assembly comprising a first stationary section having apertures adapted such that each aperture accommodates a different gas feed line from a PSA bed; a first rotatable valve section having at least two spaced-apart openings separated at a preselected arcuate degree setting and at least one channel disposed on the first valve section connected to at least one of the openings adapted for providing regulation of the pressurization of a gas between PSA beds and a second stationary section and all sections form the first valve assembly having a gas output opening adapted for exiting a gas product;
    a second valve assembly comprising a third stationary section, a second rotatable valve section having at least two spaced-apart openings separated at a preselected arcuate degree setting, and a fourth stationary section having aperture adapted such that each aperture accommodates a different gas feed line from a PSA bed, and all sections from the second valve assembly having a gas input opening adapted for receiving a feed gas and providing a constant equal feed flow to one PSA bed or unequal feed flow to more than one PSA bed;
    an indexing drive mechanism adapted for providing a preselected index setting and capable of controlling the interval of each step in the PSA cycle;
    and a rotatable shaft having the top portion secured to the first valve assembly, the bottom portion secured to the second valve assembly, and the indexing drive mechanism secured to the shaft and disposed between the two valve assemblies.

2. The indexing rotary dual valve of claim 1 wherein a second independent channel is disposed in the first rotatable section adapted for regulating the equalization of a gas flow from a selected PSA bed, and a third independent channel is disposed in the first rotatable valve section adapted for regulating the equalization of a gas flow from a different PSA bed.

3. The indexing rotary dual valve of claim 2 wherein a fourth channel is disposed in the first rotatable valve section adapted for accommodating a purge gas from the PSA.

4. The indexing rotary dual valve of claim 3 wherein a separate adjustment valve is disposed in the first, second, third and fourth channels to control the gas flow.

5. The indexing rotary dual valve of claim 1 wherein the spaced-apart opening in both the first rotatable valve section and the second rotatable valve section are spaced at the same setting as the setting of the indexing drive mechanism.

6. An indexing rotary dual valve for use in a pressure swing adsorption system (PSA) having at least two beds operating in multiple steps in the PSA cycle comprising:
    a first valve assembly comprising a first stationary section having apertures adapted such that each aperture accommodates a different gas feed line from a PSA bed; a first rotatable valve section having at least two spaced-apart openings separated at a preselected arcuate degree setting, and at least one channel disposed on the first valve section connected to at least one of the openings adapted for providing regulation of the pressurization of a gas from a PSA bed; and a second stationary section and all sections form the first valve assembly having a gas output opening adapted for exiting a gas product;
    an indexing drive mechanism adapted for providing a preselected index setting and capable of controlling the intervals of each step in the PSA cycle; and
    a first rotatable shaft having the first valve assembly and the first indexing drive mechanism spaced apart and secured to the first shaft;
    a second valve assembly comprising a third stationary section, a second rotatable valve section having at least two spaced-apart openings separated at a preselected arcuate degree setting, and a fourth stationary section having aperture adapted such that each aperture accommodates a different gas feed line from a PSA bed, and all sections from the second valve assembly having a gas input opening adapted for receiving a feed gas and providing a constant equal or unequal feed flow rate between the PSA beds;
    a second indexing drive mechanism adapted for providing a selected index setting and capable of controlling the intervals of each step in the PSA cycle; and
    a second rotatable shaft having the second valve assemble and the second indexing drive mechanism spaced apart and secured to the second shaft.

7. The indexing rotary dual valve of claim 6 wherein a second independent channel is disposed in the first rotatable section adapted for regulating the equalization of a gas flow from a selected PSA bed, and a third independent channel is disposed in the first rotatable valve section adapted for regulating the equalization of a gas flow from a different PSA bed.

8. The indexing rotary dual valve of claim 7 wherein a fourth channel is disposed in the first rotatable valve section adapted for accommodating a purge gas from the PSA.

9. The indexing rotary dual valve of claim 8 wherein a separate adjustment valve is disposed in the first, second, third and fourth channels to control the gas flow.

10. The indexing rotary dual valve of claim 6 wherein the spaced-apart opening in the first rotatable valve section is set at the same setting as the first indexing drive mechanism, and the spaced-apart openings in the second rotatable valve section is set at the same setting as the second indexing drive mechanism.

11. The indexing rotary dual valve of claim 10 wherein the setting of the first rotatable valve section is the same as or different from the setting of the second rotatable valve section.

12. A pressure swing adsorption process (PSA) having at least two beds operating in multiple steps in a PSA cycle for recovering high purity gas product from a feed gas containing impurities using an indexing rotary valve comprising:
 a) providing a source of feed gas; a source of suction force, multiple bed system, and an indexing rotary valve;
 b) feeding said feed gas through the indexing rotary valve to a bed for selectively removing an undesired component from said feed gas using selected adsorbers under selected pressures and using the indexing rotary valve for providing a constant equal feed flow to one PSA bed or unequal feed flow to more than one PSA bed, for controlling the depressurization by varying equalization down in one bed and equalization up in another bed to increase a high purity gas product output and purge gas; and
 c) using the indexing rotary valve for receiving and repelling the feed gas, controlling the interval of each step in the PSA cycle, for receiving and repelling the purge gas, and for receiving and thus collecting and dispensing the high purity gas product.

13. The pressure swing adsorption process of claim 12 wherein the intervals between steps in the PSA cycle can vary.

14. The pressure swing adsorption process of claim 12 wherein the PSA process is a 4-bed, 12-step PSA with a constant bed inlet flow rate.

15. The pressure swing adsorption process of claim 12 wherein the PSA process is a 4-bed, 12-step PSA with a variable bed inlet feed flow rate.

16. The pressure swing adsorption process of claim 12 wherein the PSA process is a 6-bed, 12-step PSA with a variable bed inlet feed flow rate.

17. The pressure swing adsorption process of claim 12 wherein the high purity gas product is selected from the group consisting of $H_2$, helium, methane and natural gas.

18. The pressure swing adsorption process of claim 12 wherein the high purity gas product is $H_2$.

19. The pressure swing adsorption process of claim 17 wherein the undesirable impurities are $CO_2$, $H_2O$, $CH_4$, CO, $N_2$ and inert gases.

20. The pressure swing adsorption process of claim 12 wherein the high purity gas product is >99.99% $H_2$.

\* \* \* \* \*